(12) United States Patent
Nako et al.

(10) Patent No.: US 7,298,927 B2
(45) Date of Patent: Nov. 20, 2007

(54) IMAGE PROCESSING APPARATUS, IMAGE PROCESSING METHOD, AND MEDIUM ON WHICH IMAGE PROCESSING PROGRAM IS RECORDED

(75) Inventors: Kazuyuki Nako, Kyoto (JP); Katsuhiko Sato, Nara (JP); Hideaki Tanaka, Nara (JP)

(73) Assignee: Sharp Kabushiki Kaisha (JP)

( * ) Notice: Subject to any disclaimer, the term of this patent is extended or adjusted under 35 U.S.C. 154(b) by 28 days.

(21) Appl. No.: 11/299,222

(22) Filed: Dec. 8, 2005

(65) Prior Publication Data

US 2006/0188148 A1    Aug. 24, 2006

Related U.S. Application Data

(62) Division of application No. 09/720,475, filed on Mar. 8, 2001, now Pat. No. 7,006,708.

(51) Int. Cl.
*G06K 9/32* (2006.01)
*G06K 15/02* (2006.01)

(52) U.S. Cl. .................. 382/298; 382/176; 358/1.2; 358/528

(58) Field of Classification Search ............... 382/171, 382/173, 274, 276, 298, 176, 190, 263–264, 382/266; 358/3.01, 1.2, 2.99, 3.12, 521, 358/528
See application file for complete search history.

(56) References Cited

U.S. PATENT DOCUMENTS 4,984,013 A * 1/1991 Terashita ................ 355/38
5,142,374 A * 8/1992 Tajika et al. ............ 358/3.1
5,204,760 A * 4/1993 Murayama et al. ...... 358/3.03
5,278,952 A    1/1994 Kira et al.

(Continued)

FOREIGN PATENT DOCUMENTS

CN    1201169    12/1998

(Continued)

OTHER PUBLICATIONS

Jiang H-F et al.: "A fast approach to the detection and correction of skew documents," Pattern Recognition Letters, vol. 18, No. 7, Jul. 1997, pp. 675-686.

(Continued)

*Primary Examiner*—Kanjibhai Patel
(74) *Attorney, Agent, or Firm*—David G. Conlin, Esq.; William J. Daley, Jr., Esq.; Edwards Angell Palmer & Dodge, LLP

(57) ABSTRACT

Featured are an image processing apparatus, method and a medium including an image processing program. The image processing apparatus includes an image inputting means for inputting an image, a character/line drawing region extracting means for extracting a character/line drawing region from the input image, a pseudo-density region extracting means for extracting a pseudo-density region from the input image, an image contracting means for contracting images in an extracted pseudo-density region, an extracted character/line drawing region, and a region other than the pseudo-density region and the character/line drawing region, by mutually different methods, and an image outputting means for outputting the contracted image. The image contracting means performs a smoothing process in the pseudo-density region, performs an averaging process and a subsequent edge enhancing process in the character/line drawing region, and performs an averaging process in a region other than the pseudo-density region and the character/line drawing region.

11 Claims, 24 Drawing Sheets

U.S. PATENT DOCUMENTS

| | | | |
|---|---|---|---|
| 5,289,293 A * | 2/1994 | Kato et al. | 358/3.07 |
| 5,452,374 A | 9/1995 | Cullen et al. | |
| 5,602,651 A | 2/1997 | Tabata et al. | |
| 5,646,744 A | 7/1997 | Knox | |
| 5,666,208 A | 9/1997 | Farrell et al. | |
| 5,687,006 A | 11/1997 | Namizuka et al. | |
| 5,717,793 A * | 2/1998 | Ushida et al. | 382/298 |
| 5,760,930 A | 6/1998 | Fukuzawa et al. | |
| 5,808,756 A | 9/1998 | Matsuda | |
| 5,832,137 A | 11/1998 | Knox | |
| 5,832,141 A * | 11/1998 | Ishida et al. | 382/298 |
| 5,841,148 A | 11/1998 | Some et al. | |
| 5,907,631 A | 5/1999 | Saitoh | |
| 5,953,463 A | 9/1999 | Tanaka et al. | |
| 5,973,802 A | 10/1999 | Hirota et al. | |
| 5,995,719 A | 11/1999 | Bourdead'hui et al. | |
| 6,005,977 A | 12/1999 | Tanimizu et al. | |
| 6,504,628 B1 | 1/2003 | Kanno et al. | |

FOREIGN PATENT DOCUMENTS

| | | |
|---|---|---|
| EP | 0 432 723 2 | 6/1991 |
| EP | 0 650 287 A2 | 4/1995 |
| EP | 0 784 396 A2 | 7/1997 |
| EP | 0 785 529 A1 | 7/1997 |
| JP | 57178474 | 2/1982 |
| JP | 61-276077 | 12/1986 |
| JP | 8-82880 | 8/1987 |
| JP | 62-180688 | 8/1987 |
| JP | 63-244973 | 10/1988 |
| JP | 3-82269 | 4/1991 |
| JP | 3-85061 | 4/1991 |
| JP | 4-219882 | 8/1992 |
| JP | 4365182 | 12/1992 |
| JP | 5-022572 | 1/1993 |
| JP | 5-258035 | 10/1993 |
| JP | 5-336386 | 12/1993 |
| JP | 6014185 | 1/1994 |
| JP | 6-62216 | 3/1994 |
| JP | 6-334856 | 12/1994 |
| JP | 7-15657 | 1/1995 |
| JP | 7-087295 | 3/1995 |
| JP | 7-121692 | 5/1995 |
| JP | 8-18778 | 1/1996 |
| JP | 8-251427 | 9/1996 |
| JP | 8-265563 | 10/1996 |
| JP | 8-340447 | 12/1996 |
| JP | 9-35063 | 2/1997 |
| JP | 9-200504 | 7/1997 |
| JP | 09-200528 | 7/1997 |
| JP | 9-233319 | 9/1997 |
| JP | 9-312770 | 12/1997 |
| JP | 9-330393 | 12/1997 |

OTHER PUBLICATIONS

Hitoshi Kiya, "Resolution Conversion of Digital Image", CQ Publishing, The Interface, Jun. 1998; Japan, pp. 72-80.

* cited by examiner

FIG. 4
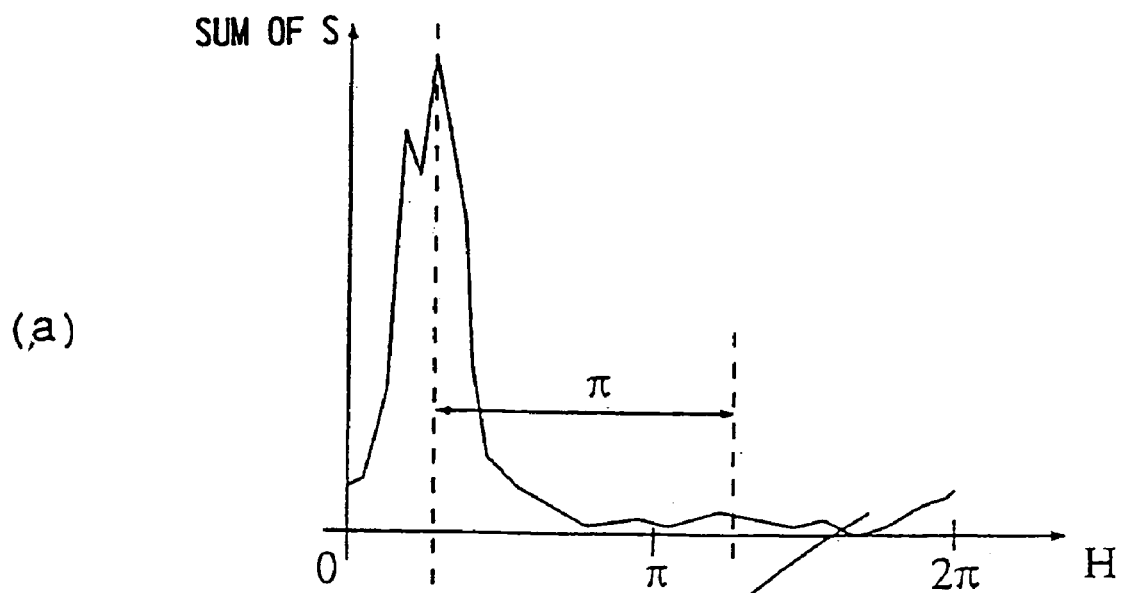
(a)
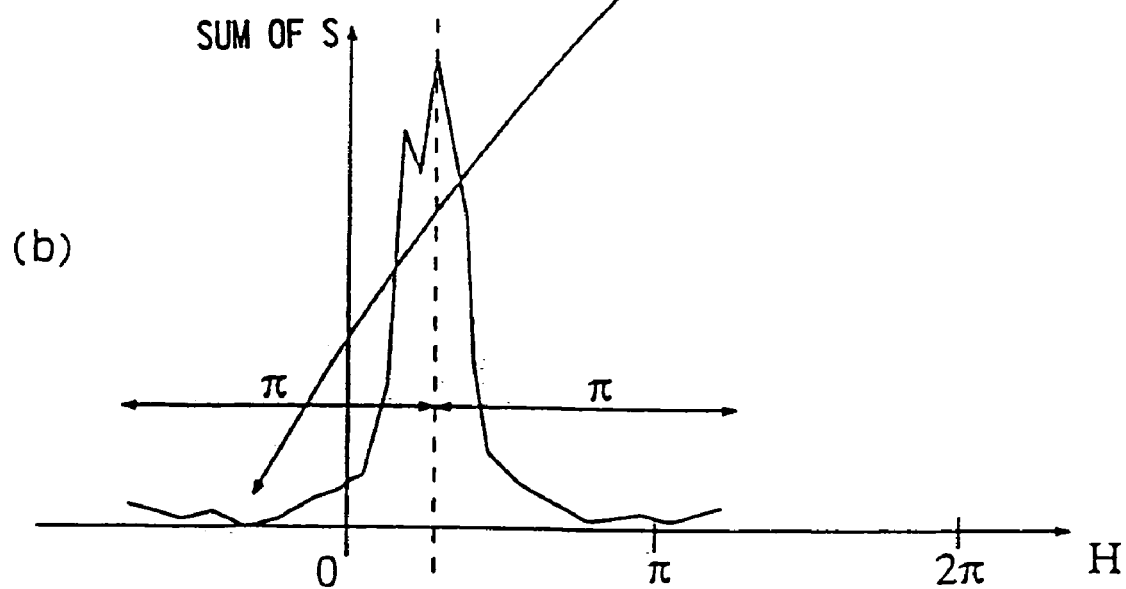
(b)

FIG. 5
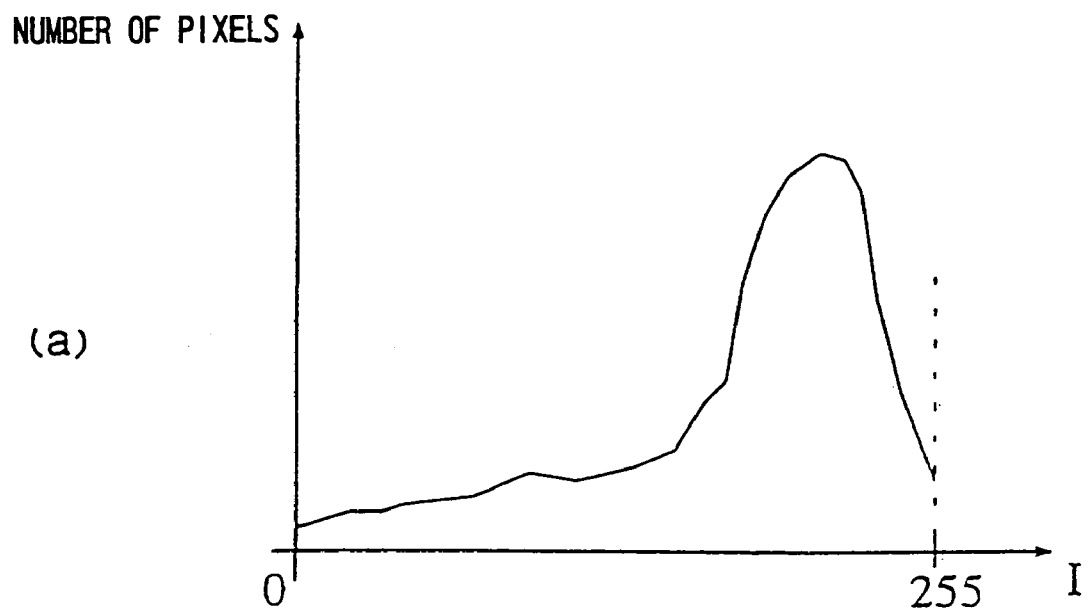
(a)
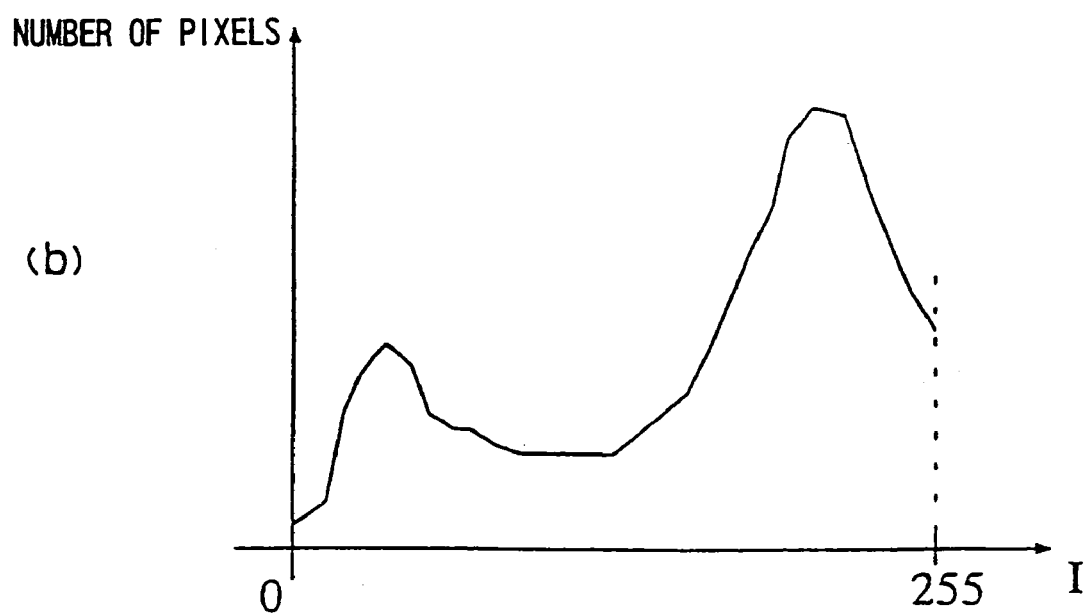
(b)

IMAGE PROCESSING APPARATUS, IMAGE PROCESSING METHOD, AND MEDIUM ON WHICH IMAGE PROCESSING PROGRAM IS RECORDED

This application is a divisional of U.S. application Ser. No. 09/720,475, filed Mar. 8,2001, now U.S. Pat. No. 7,006,708, the teachings of which are incorporated herein by reference.

TECHNICAL FIELD

The present invention relates to an image processing apparatus, an image processing method, and a medium on which an image processing program is recorded. Particularly, the invention relates to an image processing apparatus, an image processing method, and a medium on which an image processing program is recorded, each for converting, to a naturally monochromatic image, an image which is read by an image inputting means such as a scanner from an original printed in two colors, a color other than black, or the like. Further, the invention relates particularly to an image processing apparatus, an image processing method, and a medium on which an image processing program is recorded, each for contracting a composite image such as a cartoon comprising a character, a line drawing, and a halftone dot, with good precision and without a moire. Furthermore, the invention relates particularly to an image processing apparatus, an image processing method, and a medium on which an image processing program is recorded, each for performing the correction to eliminate a ghost image which occurs during the reading of an original printed on both sides or an original being stacked. Further, the invention relates particularly to an image processing apparatus, an image processing method, and a medium on which an image processing program is recorded, each for performing the aligning between desired pages in the image data of a book inputted in an authoring system for preparing the contents of an electronic book by inputting the book on the image base.

BACKGROUND ART

The progress in hardware and software has been activating the publication of electronic books as a new form of books in place of existing books on a paper medium. It has been realized to read cartoons and novels on a personal computer or a portable terminal.

Although these electronic books can be prepared correspondingly to what is called multimedia data, such as an audio, an image, a dynamic image, and an animation, it is costly and laborious to fabricate an electronic book as the primary object. Thus, an electronic book is fabricated frequently by directly computerizing an existing book.

There are following problems in the fabrication of an electronic book in accordance with a conventional art. A first problem exists in the case of converting, to a naturally monochromatic image, an image read by an image inputting means such as a scanner from a color-printed original or the like.

The conversion from a color image to a monochromatic image is generally performed by extracting the brightness component from the color image. The following Formula (1) is a formula for extracting the brightness component (Y) from red (R), green (G), and blue (B) components.

$$Y=0.299R+0.587G+0.114B \quad (1)$$

This method is used also in the NTSC system which is a system for TV broadcasting, and is widely known. In the NTSC system, a color image is decomposed into a brightness signal and a color difference signal and then transmitted. Therefore, even a monochromatic television set can display a naturally monochromatic image on the television screen by receiving and reproducing the brightness signal alone.

Formula (1) depends on the characteristics of human visual sensation, and a full-color image such as a photograph can be converted to a naturally monochromatic image by converting the brightness component to the monochromatic image.

Meanwhile, the contents of an electronic book computerized directly from an existing book can be viewed on a color display without any problem because of the unlimited number of display colors. However, a portable terminal frequently uses a monochromatic liquid-crystal display because of the important factors of a low price and a low power consumption.

Accordingly, a full-color image such as a photograph is usually converted to a monochromatic image. Using Formula (1) to convert it to a naturally monochromatic image, monochromatic contents can be produced from an existing book. Or, a color image can be displayed on a monochromatic display.

However, in the case of a certain-existing book, especially a cartoon journal, the image is sometimes printed in two colors with red ink and black ink or in a color with ink of a color selected from the group consisting of red, green, blue, and the like other than black. In that case, a desirable image quality is hardly obtained by converting such an image using Formula (1).

For example, in the case of an image printed in two colors with red ink and black ink, black is used for contours and shadows, and red is used for flesh color. When such an image is converted to a monochromatic image using Formula (1), the low mixing-ratio of red causes a problem that the red part becomes darker than the actual image.

Further, an image is sometime printed in a single color other than black, such as red, green, and blue. When people view such an image, the color itself is not explicitly recognized, and the resulted impression is similar to that of the image printed in a color of black. However, when such an image is converted to a monochromatic image using Formula (1) in a similar manner to that for a photograph, the resulted image has a thin color and a low contrast. In particular, an image printed with green ink results in an image with a very thin color because of the large mixing-ratio of green in Formula (1).

A second problem exists in the case of contracting a composite image such as a cartoon comprising a character, a line drawing, and a halftone dot, with good precision and without a moire.

Printed matter, such as a cartoon and a novel, is originally printed in a very high resolution, and a scanner for reading it also has a high resolution of 400 dpi (dot per inch), 600 dpi, or higher. In contrast, the display resolution of a personal computer or a portable terminal is at most about 100 dpi. Thus, the contraction of an image is necessary to display an existing book on a personal computer or a portable terminal.

In many cartoons, a halftone screen is used for the pseudo-expression of density and gradation. Since the halftone screen comprises fine mesh dots, lines, and patterns, the contraction thereof, as known, ordinarily results in a pattern of stripes or lattice which is called a moire. In the invention, a region to which the pseudo-expression of density or gradation is imparted is called a pseudo-density region.

Conventional art of contraction is classified into two major methods: a method in which the whole region is homogeneously processed and a method in which the region is divided and each of the divided regions is contracted optimally. The method in which the whole region is homogeneously processed generally includes a thinning-out process to achieve the contraction by simply thinning out the pixels and an averaging technique to determine the pixel value of the contracted image by averaging the pixel values of the original image (Hitoshi Kiya, Resolution Conversion of Digital Image, CQ Publishing, The Interface, June 1998, p. 72).

With regard to the region-dividing method, an image processing apparatus is described in Japanese Unexamined Patent Publication JP-A 4-365182 (1992). In accordance with the image processing apparatus described in JP-A 4-365182, a binary coded image is divided into two regions, i.e., drawing and painting regions. In the drawing region, contraction is performed so as to conserve the fine lines. In the painting region, a multi-value encoding process is performed on the base of the pixel density, and then a contraction/binary-encoding process is performed, thereby to contract even the character and the drawing sections with precision and without a moire.

However, in the case of contracting an image such as a cartoon comprising a character, a line drawing and a halftone dot in combination, the thinning-out process causes a moire in the halftone section and unclearness and blurring in the character section and the line drawing section. In contrast, in the averaging technique, a moire is suppressed and the unclearness and blurring of a character and a fine line seldom occur, but the clearness of the whole is lost. To express the clearness, an edge enhancing process can be used after the contraction. However, the suppressed moire is also enhanced and appears. Although the moire can be completely eliminated by enlarging the area in which the pixels are averaged, characters and drawings blur on the other hand.

As mentioned above, prior art homogeneous processing by the thinning-out process or the averaging process cannot achieve clear characters and drawings without a moire. Thus, it is necessary to divide the image into regions and process each region appropriately.

The image processing apparatus described in JP-A 4-365182 performs region-dividing and performs a contraction process appropriate for each region. However, in a cartoon and the like, a line drawing may exist in halftone dots. Thus, a character and a line drawing cannot be separated by simple pattern matching. Further, a character exists in a balloon within the image. Thus, separation using a simple rectangle is difficult. In a method wherein an image is separated into two regions, i.e., a character/line drawing region and the other region, and wherein smoothing is performed in the region other than the character/line drawing region, an error frequently occurs in the extraction of the character/line drawing region. For example, a rather blurring part in a fine line and a complicated character is sometimes not extracted as a character/line drawing region because of the low edge component. The process of smoothing of this region causes further blurring in the character and the line drawing section.

A third problem exists in the case of performing the correction to eliminate a ghost image which occurs during the reading of an original printed on both sides or an original being stacked.

Since an existing book is ordinarily printed on both sides of a paper, there is a problem of what is called a ghost image, which is an image on the back side being seen through during the reading thereof with a scanner and the like or during the reading of a page being stacked with a scanner and the like.

An image reader described in Japanese Unexamined Patent Publication JP-A 6-14185 (1994) is a prior art apparatus for correcting a ghost image. The image reader described in JP-A 6-14185 eliminates a ghost image part, which has a low density, by reducing the density through the density correction of the image signal, thereby preventing the copying of the seen-through image of the back side of an original or the next page of a stacked original.

An image forming apparatus described in Japanese Unexamined Patent Publication JP-A 6-62216 (1994) is an apparatus for correcting a ghost image using front image data and back image data. The image forming apparatus described in JP-A 6-62216 performs an AND operation between the front image data and the back image data, performs the smoothing of the output by a histogram calculation, and then performs a threshold process. Then the apparatus combines it with image data which is the front image data subtracted by the data of the superposed part, thereby eliminating the ghost image without the loss of the low density part of the front image.

Further, an image processing apparatus with ghost-image eliminating function described in Japanese Unexamined Patent Publication JP-A 8-340447 (1996) eliminates a ghost image by detecting a ghost image region in a video signal and the ghost image level within the ghost image region and by correcting the density of the ghost image region using the ghost image level.

However, since the image reader described in Japanese Unexamined Patent Publication JP-A 6-14185 (1994) performs the density correction on the whole image, there occurs a problem that a halftone section whitens out and that a character becomes unclear.

With regard to the image forming apparatus described in JP-A 6-62216, a ghost image cannot be completely eliminated in some cases, for example, in the case where a halftone section is seen through as a ghost image. Further, the positional relationship between the front image and the back image needs to be previously known, but the positions in which the images are read are not necessarily identical even if automatic paper feeding is used. Thus, a ghost image cannot be completely eliminated in such a case where the images are shifted from a predetermined position.

In the image processing apparatus with ghost-image eliminating function described in JP-A 8-340447, a ghost image region is defined as a region in which non-character pixels are successive, a region in which non-painting pixels are successive, a region in which pixels having a density lower than or equal to a predetermined density are successive, and a region in which pixels having a saturation lower than or equal to a predetermined saturation are successive. Accordingly, the determination is carried out in a small area. Therefore, a ghost image cannot be separated from a halftone image on the front side, for example, when the ghost image is caused by a widely spreading black dark region of characters or images.

A fourth problem exists in the case of performing the aligning between desired pages in the image data of a book inputted in an authoring system for preparing the contents of an electronic book by inputting the book on the image base.

Although an electronic book can be prepared correspondingly to what is called multimedia data, such as an audio, an image, a dynamic image, and an animation, it adopts a text (character-code) based format. Meanwhile, books on a paper medium, what is called "books" are presently being published at a pace of 500,000 or more titles a year. The accumulated number is huge. However, the number of the computerized titles is very few and almost all exist only on a paper medium. Such a prior art electronic book has the following problems because of adopting the text-(character-code) based format.

For the authoring of a book on a paper medium, the text data needs to be prepared by human work or with an OCR. Thus, the preparation of the contents requires a lot of time, which causes a difficulty in the timely supply of contents in a large amount. Further, it is difficult to prepare the contents of a book such as a cartoon and a photographic journal, in which a majority of the data is non-text. For this reason, present number of the electronic book contents is as small as a few hundred, and many of the contents are dictionaries. Accordingly, the share of electronic books is presently below 1% of that of paper books. In particular, the small number of the contents is a fatal problem, which is significantly preventing the spread of electronic books. In such a situation, to resolve the above-mentioned problems, it is possible to obtain electronic book contents by inputting them on the image base. This has the following advantage.

Contents preparation can be carried out basically only by scanning an existing book on a paper medium, which permits to supply a large amount of the contents in a short term. It permits to supply the contents of a cartoon a photographic journal, and the like, which was impossible in a text-based electronic book. Inputting is easy even when a book, such as an old document, contains a character not in the present character code system, for example, an external character and a heteromorphic character. Overseas deployment (spreading) of a viewer and a total authoring system is easy because of the independence of a language (character code). By the advantage mentioned above, an electronic book on the image base resolves all problems in an electronic book on the text base. To obtain the electronic book contents by inputting it on the image base, it can be inputted by scanner inputting with an ADF (auto document feeder) and the like, and various processes such as document structuring are carried out on it. However, the following problems occur.

In the case where an image is inclined or shifted during the scanner inputting, an user of the electronic book feels uncomfortableness because the inclination is emphasized more than in the case of a paper book by a reference line (for example, an edge section of a CRT and a liquid-crystal screen) existing in a viewer. Thus, the process of correcting this is necessary. Manual processing of this needs a lot of working time, which causes a substantial increase in the authoring time. In particular, inclination and shift in a main page results in a strong uncomfortableness during the viewing on a viewer. Further, the checking of all pages for the revision of the electronic book contents causes an increase in the authoring time, which prevents to supply a large amount of contents in a short term. Thus, an appropriate process is necessary.

A first object of the invention is to provide an image processing apparatus, an image processing method, and a medium on which an image processing program is recorded, each for converting an original printed in two colors or a color other than black to a naturally monochromatic image.

A second object of the invention is to provide an image processing apparatus, an image processing method, and a medium on which an image processing program is recorded, each for contracting a composite image such as a cartoon comprising a character, a line drawing, and a halftone dot, with clearness and without a moire.

A third object of the invention is to provide an image processing apparatus, an image processing method, and a medium on which an image processing program is recorded, each for correcting an image to eliminate a ghost image which occurs during the reading of an original printed on both sides or an original being stacked.

A fourth object of the invention is to provide an image processing apparatus, an image processing method, and a medium on which an image processing program is recorded, each for obtaining aligned images.

DISCLOSURE OF INVENTION

A first invention is an image processing apparatus comprising:

image inputting means;

color analyzing means for analyzing a color used within an input image;

mixing-ratio calculating means for calculating a mixing-ratio of color components based on an analyzed color; and converting means for converting the input image to a monochromatic image by mixing color components according to a calculated mixing-ratio.

In accordance with the invention, the data read from an original image is inputted from the image inputting means, for example, in every predetermined unit time. The color analyzing means analyzes the color used within the input image. Further, the mixing-ratio calculating means calculates the mixing-ratio of color components such as red, green and blue, based on the analyzed color. The mixing-ratio is determined so as to correspond to the color used within the input image. The converting means converts the input image to a monochromatic image by mixing color components according to the calculated mixing-ratio.

Therefore, the color of the input image is automatically determined, whereby a monochromatic image can be produced.

A second invention is characterized in that the image inputting means is capable of inputting a plurality of images;

the color analyzing means analyzes colors used within the plurality of input images;

the mixing-ratio calculating means calculates mixing-ratios of color components which are common to the plurality of images, based on analyzed colors; and the converting means converts the plurality of input images to monochromatic images by mixing color components according to calculated mixing-ratios.

In accordance with the invention, the data read from the plurality of original images is inputted from the image inputting means, for example, in every predetermined unit time. The color analyzing means analyzes colors used within the plurality of input images. Further, the mixing-ratio calculating means calculates mixing-ratios of color components which are common to the plurality of images, based on the analyzed colors. That is, the mixing-ratios are determined to correspond to the colors used within the plurality of input images. The converting means converts the plurality of input images to monochromatic images by mixing color components according to the calculated mixing-ratios.

Therefore, the colors of the plurality of input images are automatically determined, whereby monochromatic images can be produced. Further, since color determination is carried out with respect to the plurality of input images, more accurate determination can be achieved. Furthermore, since monochromatic images are produced in the same conditions for the plurality of input images, the images can be produced stably.

A third invention is an image processing apparatus comprising:

image inputting means;

color specifying means for externally specifying a color used within an input image;

mixing-ratio calculating means for calculating a mixing-ratio of color components based on a specified color; and converting means for converting the input image to a monochromatic image by mixing color components according to a calculated mixing-ratio.

In accordance with the invention, the color specifying means specifies a color used within the image inputted from the image inputting means. Further, the mixing-ratio calculating means calculates the mixing-ratio of color components based on the specified color. That is, the mixing-ratio is determined so as to correspond to the color used within the input image. The converting means converts the input image to a monochromatic image by mixing color components according to the calculated mixing-ratio.

Therefore, a monochromatic image with higher accuracy can be produced by specifying the color used within the input image by a user.

A fourth invention is an image processing apparatus comprising:

image inputting means;

mixing-ratio specifying means for externally specifying a mixing-ratio of color components; and converting means for converting an input image to a monochromatic image by mixing color components according to a specified mixing-ratio.

In accordance with the invention, the mixing-ratio specifying means specifies the mixing-ratio of color components for the image inputted from the image inputting means. The converting means converts the input image to a monochromatic image by mixing color components according to the specified mixing-ratio.

Therefore, a desired monochromatic image can be produced by specifying the mixing-ratio of color components by a user.

A fifth invention is an image processing method comprising:

a color analyzing step of analyzing a color used within an input image;

a mixing-ratio calculating step of calculating a mixing-ratio of color components based on an analyzed color; and a converting step of converting the input image to a monochromatic image by mixing color components according to a calculated mixing-ratio.

In accordance with the invention, an original image is read, for example, in every predetermined unit time, and the data is inputted. The color used within the image is analyzed. The mixing-ratio of color components is calculated based on the analyzed color, whereby the mixing-ratio is determined so as to correspond to the color used within the input image. Further, the color components are mixed according to the calculated mixing-ratio, and the input image is converted to a monochromatic image.

Therefore, the color of the input image is automatically determined, whereby a monochromatic image can be produced.

A sixth invention is characterized in that in the color analyzing step color analysis is carried out based on distribution of hue, saturation and lightness of the input image.

In accordance with the invention, analysis of the color used within the image is carried out, based on the distribution of hue, saturation and lightness of the input image. For example, representative hue and dispersion are calculated from the distribution of hue and saturation. Then, the presence or absence of black pixels is determined from the histogram of lightness. Analysis of the colors used within the input image is further carried out. That is, when representative hue is absent, the image is determined as a monochromatic image. When the dispersion is greater than or equal to a predetermined value, the image is determined as an image in which plural colors are used. In the case where representative hue is absent and the dispersion is greater than or equal to a predetermined value, the image is determined as a monochromatic image in a color other than black when a black pixel is absent, and the image is determined as an image in black plus a color other than black when a black pixel is present. Further, the mixing-ratio of color components is calculated based on the analyzed colors, whereby the mixing-ratio is determined according to the colors used within the input image. Further, the color components are mixed according to the calculated mixing-ratio, and the input image is converted to a monochromatic image.

Therefore, it is possible to produce a monochromatic image by automatically determining the color of the input image.

A seventh invention is an image processing method comprising:

a color analyzing step of analyzing colors used within a plurality of input images;

a mixing-ratio calculating step of calculating mixing-ratios of color components which are common to the plurality of input images, based on analyzed colors; and a converting step of converting the plurality of input images to monochromatic images by mixing color components according to calculated mixing-ratios.

In accordance with the invention, data is inputted, for example, by reading a plurality of original images in every predetermined unit time, colors used within the images are analyzed, and the mixing-ratios of color components which are common to the plurality of images are calculated according to the analyzed colors, whereby the mixing-ratios are determined in correspondence to the colors used within the input images. Further, the color components are mixed according to the calculated mixing-ratios, and the plurality of input images are converted to monochromatic images.

Therefore, the colors of the plurality of input images are automatically determined and monochromatic images can be produced. Further, since the colors are determined from the plurality of input images, the colors can be determined more accurately. Furthermore, since monochromatic images are produced in the same conditions for the plurality of input images, the images can be produced stably.

An eighth invention is an image processing method comprising:

a color specifying step of externally specifying a color used within an input image;

a mixing-ratio calculating step of calculating a mixing-ratio of color components based on a specified color; and a converting step of converting the input image to a monochromatic image by mixing color components according to a calculated mixing-ratio.

In accordance with the invention, the color used within the input image is specified, the mixing-ratio of color components is calculated based on the color, the mixing-ratio is determined correspondingly to the color used within the input image, color components are mixed according to the calculated mixing-ratio, and the input image is converted to a monochromatic image.

Therefore, a user can produce a monochromatic image with higher accuracy by specifying the color used within the input image.

A ninth invention is characterized in that in the mixing-ratio calculating step a mixing-ratio is calculated based on a mixing-ratio table in which a mixing-ratio of color components corresponding to the color used within the input image is previously stored.

In accordance with the invention, the color used within an input image is analyzed or specified. The mixing-ratio of color components is calculated based on the color used within the input image. The mixing-ratio is calculated by referring to the mixing-ratio table. Further, color components are mixed according to the calculated mixing-ratio, and the input image is converted to a monochromatic image.

Therefore, it is possible to produce a monochromatic image by automatically determining the color of the input image. Further, by calculating the mixing-ratio with reference to the mixing-ratio table, an optimum mixing-ratio is rapidly obtained for each color used within the image. Thus, a more optimum monochromatic image can be produced at high speed.

A tenth invention is characterized in that in the mixing-ratio calculating step the mixing-ratio is calculated based on a ratio of color components of a complimentary color of the color used within the input image.

In accordance with the invention, the color used within an input image is analyzed or specified. The mixing-ratio of color components is calculated based on the color used within the input image. Here, the mixing-ratio is calculated based on the color component ratio of a complimentary color of the color used within the input image. Further, the color components are mixed according to the calculated mixing-ratio, and the input image is converted to a monochromatic image.

Therefore, it is possible to produce a monochromatic image with high contrast by automatically determining the colors of the input image.

An eleventh invention is characterized in that in the mixing-ratio calculating step the mixing-ratio is calculated based on a color component ratio of a complimentary color of the color used within the input image and the color component ratio of the colors used within the input image.

In accordance with the invention, the color used within an input image is analyzed or specified. The mixing-ratio of color components is calculated based on the color, and accordingly the mixing-ratio is determined correspondingly to the color used within the input image. The mixing-ratio is calculated based on the color component ratio of the complimentary color of the color used within the input image and the color component ratio of the color used within the input image. Further, the color components are mixed according to the calculated mixing-ratio, and the input image is converted to a monochromatic image.

Therefore, the color of the input image is automatically determined, and a high-contrast monochromatic image in which discrimination between the color used in the image and black is easily carried out can be produced.

A twelfth invention is an image processing method comprising:

a mixing-ratio specifying step of externally specifying a mixing-ratio of color components of an input image; and a converting step of converting the input image to a monochromatic image by mixing color components according to a specified mixing-ratio.

In accordance with the invention, the mixing-ratio of color components of the input image is specified, and by mixing color components according to the mixing-ratio, the input image is converted to a monochromatic image.

Therefore, a desired monochromatic image can be produced by specifying the mixing-ratio of color components.

A thirteenth invention is an medium on which an image processing program is recorded, the image processing program being for causing a computer to execute a color analyzing step of analyzing a color used within an input image; a mixing-ratio calculating step of calculating a mixing-ratio of color components based on a analyzed color; and a converting step of converting the input image to a monochromatic image by mixing color components according to a calculated mixing-ratio.

In accordance with the invention, by following the image processing program recorded on the medium, a computer analyzes the color used within an input image, calculates the mixing-ratio of color components based on the color thereby to determine the mixing-ratio correspondingly to the color used within the input image, mixes the color components according to the mixing-ratio, and achieves the conversion from the input image to a monochromatic image. Therefore, the color of the input image is automatically determined and a monochromatic image can be produced.

A fourteenth invention is an medium on which an image processing program is recorded, the image processing program being for causing a computer to execute a color analyzing step of analyzing colors used within a plurality of input images; a mixing-ratio calculating step of calculating mixing-ratios of color components which are common to the plurality of input images, based on analyzed colors; and a converting step of converting the plurality of input images to monochromatic images by mixing color components according to calculated mixing-ratios.

In accordance with the invention, by following the image processing program recorded on the medium, a computer analyzes the color used within a plurality of input images, calculates the mixing-ratios of color components which are common to the plurality of input images, based on the colors, thereby to determine the mixing-ratios correspondingly to the colors used within the plurality of input images, mixes color components according to the mixing-ratios, and achieves the conversion from the plurality of input images to monochromatic images. Therefore, it is possible to produce monochromatic images by automatically determining the colors of the plurality of input images.

A fifteenth invention is an medium on which an image processing program is recorded, the image processing program being for causing a computer to execute a color specifying step of externally specifying a color used within an input image; a mixing-ratio calculating step of calculating a mixing-ratio of color components based on a specified color; and a converting step of converting the input image to a monochromatic image by mixing color components according to a calculated mixing-ratio.

In accordance with the invention, by following the image processing program recorded on the medium, a computer specifies a color used within an input image, calculates the mixing-ratio of color components based on the color thereby to determine the mixing-ratio correspondingly to the color used within the input image, mixes color components according to the mixing-ratio, and achieves the conversion from the input image to a monochromatic image. Therefore, it is possible to produce a monochromatic image with higher accuracy by specifying the color used within the input image by a user.

A sixteenth invention is an medium on which an image processing program is recorded, the image processing program being for causing a computer to execute a mixing-ratio specifying step of externally specifying a mixing-ratio of color components of an input image; and a converting step of converting the input image to a monochromatic image by mixing color components according to a specified mixing-ratio.

In accordance with the invention, by following the image processing program recorded on the medium, a computer specifies a mixing-ratio for an input image, mixes the color components according to the specified mixing-ratio, and achieves the conversion from the input image to a monochromatic image. Therefore, it is possible to produce a desired monochromatic image by specifying the mixing-ratio of color components by a user.

A seventeenth invention is an image processing apparatus comprising:

image inputting means for inputting an image;

character/line drawing region extracting means for extracting a character/line drawing region from the input image;

pseudo-density region extracting means for extracting a pseudo-density region from the input image;

image contracting means for contracting images in an extracted pseudo-density region, an extracted character/line drawing region, and a region other than the pseudo-density region and the character/line drawing region, by mutually different methods; and image outputting means for outputting the contracted image.

In accordance with the invention, an image is inputted by the image inputting means, and from the image a character/line drawing region is extracted by the character/line drawing region extracting means and a pseudo-density region is extracted by the pseudo-density region extracting means. The image contracting means contracts the image using mutually different methods respectively in the pseudo-density region, the character/line drawing region, and the other region. The image outputting means outputs the contracted image.

Therefore, by dividing the input image into three regions, i.e., a pseudo-density region, a character/line drawing region and the other region, and by contracting the image in each region using a different method, the image can be contracted with a moire being suppressed in the pseudo-density region, the image can be clearly contracted in the character/line drawing region, and the image can be properly contracted in the other region. For example, even in the case where a moire occurs in the contraction of an image read and inputted at a predetermined resolution, the image read and inputted at a predetermined resolution can be clearly contracted without the occurrence of a moire in accordance with the invention.

An eighteenth invention is characterized in that the image contracting means performs a smoothing process in the pseudo-density region, performs an averaging process and a subsequent edge enhancing process in the character/line drawing region, and performs an averaging process in a region other than the pseudo-density region and the character/line drawing region.

In accordance with the invention, an image is inputted by the image inputting means, and from the image a character/line drawing region is extracted by the character/line drawing region extracting means and a pseudo-density region is extracted by the pseudo-density region extracting means. The image contracting means contracts the image using mutually different methods respectively in the pseudo-density region, the character/line drawing region and the other region. The image is contracted, by a smoothing process in the pseudo-density region, by an averaging process and a subsequent edge enhancing process in the character/line drawing region, and by an averaging process in the other region. The image outputting means outputs the contracted image.

Therefore, the image can be contracted with a moire being suppressed in the pseudo-density region, the image can be clearly contracted in the character/line drawing region, and the image can be properly contracted in the other region.

A nineteenth invention is characterized in that the character/line drawing region extracting means extracts a character/line drawing region from the input image before the extraction of a pseudo-density region.

In accordance with the invention, an image is inputted by the image inputting means, and from the image the character/line drawing region extracting means extracts a character/line drawing region and thereafter the pseudo-density region extracting means extracts a pseudo-density region. The image contracting means contracts the image using mutually different methods respectively in the pseudo-density region, the character/line drawing region and the other region. The image outputting means outputs the contracted image.

Therefore, from the input image a character/line drawing region is firstly extracted and a pseudo-density region is then extracted. Therefore, the character/line drawing region can be accurately extracted without being affected from the pseudo-density region, even when it exists within the pseudo-density region.

A twentieth invention is characterized in that the character/line drawing region extracting means extracts a character/line drawing region by performing an edge extraction of the input image after performing a smoothing process thereof.

In accordance with the invention, an image is inputted by the image inputting means, and from the image the character/line drawing region extracting means extracts a character/line drawing region and thereafter the pseudo-density region extracting means extracts a pseudo-density region. The character/line drawing region is extracted by the edge extraction of the input image after the smoothing process thereof. The image contracting means contracts the image using mutually different methods respectively in the pseudo-density region, the character/line drawing region and the other region. The image outputting means outputs the contracted image.

Therefore, from the input image a character/line drawing region is firstly extracted as mentioned above and a pseudo-density region is then extracted. Therefore, the character/line drawing region can be accurately extracted without being affected from the pseudo-density region, even when it exists within the pseudo-density region.

A twenty-first invention is characterized in that the pseudo-density region extracting means calculates a dispersion of peripheral pixels around each pixel of the input image and extracts, as a pseudo-density region, the pixel which is one of pixels having a large dispersion and exists in a region which is not extracted as a character/line drawing region by the character/line drawing region extracting means.

In accordance with the invention, an image is inputted from the image inputting means, and from the input image the character/line drawing region extracting means extracts a character/line drawing region and the pseudo-density region extracting means extracts a pseudo-density region. From the input image the character/line drawing region is firstly extracted and thereafter the pseudo-density region is extracted. Further, the character/line drawing region is extracted by the predetermined technique described above. The pseudo-density region is extracted by calculating the dispersion of the peripheral pixel's around each pixel of the input image and by extracting, as a pseudo-density region, the pixel which is one of the pixels having a large dispersion and exists in the region which is not extracted as a character/line drawing region. The image contracting means contracts the image using mutually different methods respectively in the pseudo-density region, the character/line drawing region and the other region. The image outputting means outputs the contracted image.

Therefore, by calculating the dispersion of peripheral pixels and by extracting, as a pseudo-density region, the pixel is one of the pixels having a large dispersion and exists in the region which is not extracted as a character/line drawing region, the character/line drawing region is eliminated, whereby the pseudo-density region alone can be extracted accurately.

A twenty-second invention is characterized in that the pseudo-density region extracting means calculates a correlation of peripheral pixels around each pixel of the input image and extracts, as a pseudo-density region, a pixel which is one of pixels having a low correlation and exists in the region which is not extracted as a character/line drawing region by the character/line drawing region extracting means.

In accordance with the invention, an image is inputted from the image inputting means, and from the image the character/line drawing region extracting means extracts a character/line drawing region and the pseudo-density region extracting means extracts a pseudo-density region. From the input image the character/line drawing region is firstly extracted and thereafter the pseudo-density region is extracted. Further, the character/line drawing region is extracted by the predetermined technique described above. The pseudo-density region is extracted by calculating the correlation of the peripheral pixels around each pixel of the input image and by extracting, as a pseudo-density region, the pixel which is one of the pixels having a low correlation and exists in the region which is not extracted as a character/line drawing region. The image contracting means contracts the image using mutually different methods respectively in the pseudo-density region, the character/line drawing region and the other region. The image outputting means outputs the contracted image.

Therefore, by calculating the correlation of peripheral pixels and by extracting, as a pseudo-density region, the pixel which is one of the pixels having a low correlation and exists in the region which is not extracted as a character/line drawing region, the character/line drawing region is eliminated more securely, whereby the pseudo-density region alone can be extracted accurately.

A twenty-third invention is characterized in that the pseudo-density region extracting means detects an edge region of the input image and extracts, as a pseudo-density region, a region which is one of the extracted edge regions and is not extracted as a character/line drawing region by the character/line drawing region extracting means.

In accordance with the invention, an image is inputted from the image inputting means, and from the image the character/line drawing region extracting means extracts a character/line drawing region and the pseudo-density region extracting means extracts a pseudo-density region. From the input image the character/line drawing region is firstly extracted from the input image and thereafter the pseudo-density region is extracted. Further, the character/line drawing region is extracted by the predetermined technique described above. Here, the pseudo-density region is extracted by detecting an edge region of the input image and by extracting, as a pseudo-density region, the region which is one of the edge regions and is not extracted as a character/line drawing region. The image contracting means contracts the image using mutually different methods respectively in the pseudo-density region, the character/line drawing region and the other region. The image outputting means outputs the contracted image.

Therefore, the edge filter is simple, and the pseudo-density region can be extracted faster.

A twenty-fourth invention is characterized in that contracting means performs edge detection of an extracted pseudo-density region and repeats the smoothing process for a region having a density greater than or equal to a predetermined value.

In accordance with the invention, an image is inputted from the image inputting means, and from the image the character/line drawing region extracting means extracts a character/line drawing region and the pseudo-density region extracting means extracts a pseudo-density region. The image contracting means contracts the image by the smoothing process in the pseudo-density region, contracts the image by the averaging process and a subsequent edge enhancing process in the character/line drawing region, and contracts the image by an averaging process in the other region. The edge detection is carried out in the pseudo-density region and the smoothing process is repeated for a region having a density greater than or equal to a predetermined value. The image outputting means outputs the contracted image.

Therefore, occurrence of moire can be securely suppressed in the pseudo-density region and the image can be precisely contracted.

A twenty-fifth invention is characterized in that the image contracting means performs edge detection of the extracted pseudo-density region and interrupts a contracting process for a region having a density greater than or equal to a predetermined value.

In accordance with the invention, an image is inputted from the image inputting means, and from the image the character/line drawing region extracting means extracts a character/line drawing region and the pseudo-density region extracting means extracts a pseudo-density region. The image contracting means contracts the image using mutually different methods respectively in the pseudo-density region, the character/line drawing region and the other region. Here, the edge detection is performed for the pseudo-density region and for a region having a density greater than or equal to a predetermined value, the contracting process is interrupted.

Therefore, the normal contracting process can be continued without an unnecessary contracting process.

A twenty-sixth invention is an image processing method comprising:

an image inputting step;

a character/line drawing region extracting step of extracting a character/line drawing region from an input image;

a pseudo-density region extracting step of extracting a pseudo-density region from the input image;

a image contracting step of contracting the image using mutually different methods respectively in the extracted pseudo-density region, the extracted character/line drawing region and the region other than the pseudo-density region and the character/line drawing region; and an image outputting step of outputting an contracted image.

In accordance with the invention, an image is inputted, and from the image a character/line drawing region is extracted and a pseudo-density region is extracted. The image is contracted using mutually different methods respectively in the pseudo-density region, the character/line drawing region and the other region. The contracted image is then outputted. Therefore, the image can be contracted with a moire being suppressed in the pseudo-density region, the image can be clearly contracted in the character/line drawing region, and the image can be properly contracted in the other region.

A twenty-seventh invention is an medium recording an image processing program for causing a computer to execute an image inputting step; a character/line drawing region extracting step of extracting a character/line drawing region from an input image; a pseudo-density region extracting step of extracting a pseudo-density region from the input image; an image contracting step of contracting the image using mutually different methods respectively in the extracted pseudo-density region, the extracted character/line drawing region and the region other than the pseudo-density region and the character/line drawing region; and an image outputting step of outputting a contracted image.

In accordance with the invention, by following the image processing program recorded on the medium, a computer extracts a character/line drawing region from the image, extracts a pseudo-density region, contracts the image using mutually different methods respectively in the pseudo-density region, the character/line drawing region, and the other region, and outputs it. Therefore, the image can be contracted with a moire being suppressed in the pseudo-density region, the image can be clearly contracted in the character/line drawing region, and the image can be properly contracted in the other region.

A twenty-eighth invention is an image processing apparatus comprising:

image inputting means for inputting front and back images of an original;

image reversing means for reversing one of the front and back images;

positional relationship detecting means for detecting the positional relationship between the front image reversed by the image reversing means and the back image from the image inputting means or the positional relationship between the back image reversed by the image reversing means and the front image from the image inputting means;

image correcting means for correcting the image to eliminate a ghost image of the image using the positional relationship between the front and back images obtained from the positional relationship detecting means; and image outputting means for outputting the image.

In accordance with the invention, front and back images are inputted from the image inputting means. After one of the images is reversed by the image reversing means, the positional relationship between the front and back images is detected by the positional relationship detecting means. The image is corrected to be free from a ghost image by the image correcting means using the positional relationship, and then outputted by the image outputting means. Therefore, the input image can be outputted without a ghost image.

A twenty-ninth invention is characterized in that the positional relationship detecting means detects the positional relationship between the front and back images by extracting the high brightness component alone of the front and back images and by performing the block matching of the high brightness component.

In accordance with the invention, front and back images are inputted from the image inputting means. After any one of the images is reversed by the image reversing means, the positional relationship between the front and back images is detected by the positional relationship detecting means. Here, the detection of the positional relationship between the front and back images is carried out by extracting the high brightness component alone of the front and back images and by performing the block matching of the high brightness component. The image is corrected to be free from a ghost image by the image correcting means using the positional relationship, and then outputted by the image outputting means. Accordingly, the positional relationship can be detected more precisely, and the input image can be outputted more securely without a ghost image.

A thirtieth invention is an image processing apparatus comprising:

image inputting means;

edge detecting means for detecting an edge of the image form the image inputting means;

image correcting means for correcting the image to eliminate a ghost image of the image by raising the brightness of high brightness pixels other than the edge of the image outputted from the edge detecting means; and image outputting means for outputting the image.

In accordance with the invention, the image inputting means inputs an image, and the edge detecting means detects an edge of the image. The image correcting means corrects the image to eliminate a ghost image of the image by raising the brightness of high brightness pixels other than the edge of the image outputted from the edge detecting means. The image outputting means outputs the image. Accordingly, the input image can be outputted with the unclearness of a character being prevented and without a ghost image.

A thirty-first invention is an image processing apparatus comprising:

image inputting means;

edge detecting means for detecting an edge of the image form the image inputting means;

image dividing means for dividing the image depending on the edge and low brightness pixels of the image outputted from the edge detecting means;

image correcting means for correcting the image to eliminate a ghost image of the image by calculating the average brightness within a region divided by the image dividing means and by raising the brightness of the high brightness region alone; and image outputting means for outputting the image.

In accordance with the invention, the image inputting mean's inputs an image, and the edge detecting means detects an edge of the image. The image dividing means divides the image based on the edge and low brightness pixels of the image outputted from the edge detecting means. The image correcting means corrects the image to eliminate a ghost image of the image by calculating the average brightness within a divided region and by raising the brightness of the high brightness region alone. The image outputting means outputs the image. Accordingly, the input image can be outputted with the whitening-out of a halftone section being prevented and without a ghost image.

A thirty-second invention is characterized in that the image correcting means acquires an representative brightness from the pixels having a brightness within a predetermined range, thereby raising the brightness of the region with referencing to the representative brightness.

In accordance with the invention, the image inputting means inputs an image, and the edge detecting means detects an edge of the image. The image dividing means divides the image based on the edge and the low brightness pixel of the image outputted from the edge detecting means. The image correcting means corrects the image to eliminate a ghost image of the image by calculating the average brightness within a divided region and by raising the brightness of the high brightness region alone. Here, it acquires an representative brightness from the pixels having a brightness within a predetermined range, thereby raising the brightness of the region with referencing to the representative brightness. The image outputting means outputs the corrected image. Accordingly, the input image can be outputted without a ghost image, free from the influence of the difference in the transmittance depending on the paper quality.

A thirty-third invention is an image processing method comprising:

an image reversing step of reversing one of front and back images of an original;

a positional relationship detecting step of detecting a positional relationship between the reversed one and the other of the front and back images; and an image correcting step of correcting the other one to eliminate a ghost image of the reversed one using a result of the positional relationship detection.

In accordance with the invention, front and back images are inputted, and after one of the images is reversed, the positional relationship between'the reversed one and the other one of the front and back images is detected, the other one is corrected to be free from a ghost image of the reversed one using the positional relationship, and then outputted. Accordingly, the input image can be outputted without a ghost image.

A thirty-fourth invention is an image processing method comprising:

an image-edge detecting step of detecting an edge of an image; and an image correcting step of correcting the image to eliminate a ghost image from the image by raising the brightness of high brightness pixels other than a detected edge.

In accordance with the invention, an image is inputted, an edge of the image is detected to correct the image to be free from a ghost image in the image by raising the brightness of high brightness pixels other than the edge of the image outputted from the edge detection and output the resulting image. Accordingly, it is possible to output the input image without unclearness of characters and a ghost image.

A thirty-fifth invention is an image processing method comprising:

an image-edge detecting step of detecting an edge of an image;

an image dividing step of dividing the image based on a detected edge and low brightness pixels; and an image correcting step of correcting the image to eliminate a ghost image from the image by calculating an average brightness within a divided region and by raising a brightness of the high brightness region alone.

In accordance with the invention, an image is inputted, an edge of the image is detected, the image is divided based on the edge and the low brightness pixels of the image outputted from the edge detection, and the image is corrected to be free from a ghost image by calculating the average brightness within a divided region and by raising the brightness of the high brightness region alone, and then outputted. Accordingly, it is possible to output the input image without whitening-out of a halftone section and a ghost image.

A thirty-sixth invention is an medium on which an image processing program is recorded, the image processing program being for causing a computer to execute an image reversing step of reversing one of front and back images; a positional relationship detecting step of detecting a positional relationship between the reversed one and the other of the front and back images; and an image correcting step of correcting the image to eliminate a ghost image from the other using a result of the positional relationship detection.

In accordance with the invention, by following the image processing program recorded on the medium, a computer reverses one of inputted front and back images, thereafter, detects the positional relationship between the reversed one and the other of the front and back images, corrects the image to eliminate a ghost image from the other image using the positional relationship, and outputs a resulting image. Accordingly, the input image can be outputted without a ghost image.

A thirty-seventh invention is an medium on which an image processing program is recorded, the image processing program being for causing a computer to execute an image-edge detecting step of detecting an edge of an image; and an image correcting step of correcting the image to eliminate a ghost image of the image by raising a brightness of a high brightness pixel other than the detected edge.

In accordance with the invention, by following the image processing program recorded on the medium, a computer detects an edge of an inputted image, corrects the image to eliminate a ghost image from the image by raising the brightness of a high brightness pixel other than the edge of the image outputted from the edge detection, and outputs a resulting image. Accordingly, the input image can be outputted without unclearness of characters and a ghost image.

A thirty-eighth invention is an medium on which an image processing program is recorded, the image processing program being for causing a computer to execute an image-edge detecting step of detecting an edge of an image; an image dividing step of dividing the image based on a detected edge and low brightness pixels; and an image correcting step of correcting the image to eliminate a ghost image from the image by calculating an average brightness within a divided region and by raising a brightness of a high brightness region alone.

In accordance with the invention, by following the image processing program recorded on the medium, a computer detects an edge of an inputted image, divides the image based on the edge and the low brightness pixels of the image outputted from the edge detection, corrects the image to eliminate a ghost image from the image by calculating the average brightness within a divided region and by raising the brightness of the high brightness region alone, and outputs a resulting image. Accordingly, it is possible to output the input image without a ghost image with the whitening-out of a halftone section being prevented.

A thirty-ninth invention is an image processing apparatus comprising:

image inputting means for inputting an image page by page;

image determining means for determining a predetermined image from among inputted images;

template acquiring means for acquiring a template used as an alignment reference from an image which is determined as the predetermined image; and image correcting means for correcting a position between the images based on the template, thereby aligning images of consecutive pages.

In accordance with the invention, the image inputting means inputs an image page by page, the image determining means determines a predetermined image from among the images, the template acquiring means acquires a template from the determined image, and the image correcting means corrects the position between the images based on the template, whereby the images of consecutive pages are aligned.

Accordingly, the alignment between desired consecutive images from among the images inputted page by page can be carried out in a short time.

A fortieth invention is an image processing apparatus comprising:

image inputting means for inputting an image page by page of a book;

image determining means for determining a predetermined main-text image from among inputted images;

template acquiring means for acquiring a template used as an alignment reference from an image which is determined as the predetermined main-text image; and image correcting means for correcting a position between the main-text images based on the template, thereby aligning the main-text images of consecutive pages.

In accordance with the invention, the image inputting means inputs an image page by page of a book, the image determining means determines a predetermined main-text image from among the images, the template acquiring means acquires a template from the determined image, and the image correcting means corrects the position between main-text images based on the template, whereby the main-text images of consecutive pages are aligned.

Accordingly, the alignment between main-text images from among the main-text images inputted page by page can be carried out in a short time. Thus, the contents of an electronic book can be prepared in a short term. Further, since the position of the main-text images is aligned when the electronic book is viewed in a viewer, uncomfortableness to a user can be eliminated.

A forty-first invention is an image processing method comprising:

an image determining step of determining a predetermined image from among images inputted page by page;

a template acquiring step of acquiring a template used as an alignment reference from an image which is determined as the predetermined image; and an image correcting means for correcting a position between the images based on the template, thereby aligning images of consecutive pages.

In accordance with the invention, a predetermined image is determined from among the images inputted page by page. A template is acquired from the determined image. The position between the images is corrected based on the template, thereby aligning the images of consecutive pages. Accordingly, the alignment between desired consecutive images from among the images inputted page by page can be carried out in a short time.

A forty-second invention is characterized in that the template acquiring step is a step of acquiring, as a template, positional information of a rectangle defined by circumscribing lines obtained from an ensemble of edge points acquired by scanning the input image.

In accordance with the invention, a predetermined image is determined from among the images inputted page by page, and a template is acquired from the determined image. Here, the template is acquired as the positional information of the rectangle defined by the circumscribing lines obtained from the ensemble of the edge points acquired by scanning the input image. The position between the images is corrected based on the template, thereby aligning the images of consecutive pages. Accordingly, since the template is acquired using the circumscribing lines, an accurate template can be obtained, thereby improving the precision of the alignment.

A forty-third invention is characterized in that the image processing method further comprises a step of generating warning data in the case where the predetermined image is determined from among input images during the image determining step and that positional information of the input image and positional information of the template are out of a predetermined range.

In accordance with the invention, a predetermined image is determined from among the images inputted page by page, and a template is acquired from the determined image, as described above. The position between the images is corrected based on the template, thereby aligning the images of consecutive pages. Warning data is generated in the case where the predetermined image is determined from among the input images and the positional information of the input image and the positional information of the template are out of a predetermined range. Accordingly, failure in the alignment between the images can be detected, and hence, there is convenience in revision during or after the authoring.

A forty-fourth invention is an image processing method comprising:

an image determining step of determining a predetermined main-text image from among images inputted page by page of a book;

a template acquiring step of acquiring a template used as an alignment reference from an image which is determined as the predetermined main-text image; and an image correcting step of correcting a position between the main-text images based on the template, thereby aligning main-text images of consecutive pages.

In accordance with the invention, a predetermined main-text image is determined from among the images inputted page by page of a book. A template is acquired from the determined image. The position between main-text images is corrected based on the template, thereby aligning the main-text images of consecutive pages.

Accordingly, the alignment between main-text images from among the main-text images inputted page by page can be carried out in a short time. Thus, the contents of an electronic book can be prepared in a short term. Further, since the position of the main-text images is aligned when the electronic book is viewed in a viewer, uncomfortableness to a user can be eliminated.

A forty-fifth invention is an medium on which an image processing program is recorded, the image processing program being for causing a computer to execute an image determining step of deter mining a predetermined image from among images inputted page by page; a template acquiring step of acquiring a template used as an alignment reference from an image which is determined as the predetermined image; and image correcting means for correcting a position between images based on the template, thereby aligning images of consecutive pages.

In accordance with the invention, by following the image processing program recorded on the medium, a computer determines a predetermined image from among the images inputted page by page, acquires a template from the determined image, and corrects the position between the images based on the template, thereby aligning the images of consecutive pages. Accordingly, the alignment between desired consecutive images from among the images inputted page by page can be carried out in a short time.

A forty-sixth invention is an medium on which an image processing program is recorded, the image processing program being for causing a computer to execute an image determining step of determining a predetermined main-text image from among images inputted page by page of a book; template acquiring step of acquiring a template used as an alignment reference from an image which is determined as the predetermined main-text image; and image correcting step of correcting a position between the main-text images based on the template, thereby aligning main-text images of consecutive pages.

In accordance with the invention, by following the image processing program recorded on the medium, a computer determines a predetermined main-text image from among the images inputted page by page of a book, acquires a template from the determined image, and corrects the position between main-text images based on the template, thereby aligning the main-text images of consecutive pages. Accordingly, the alignment between main-text images from among the main-text images inputted page by page can be carried out in a short time. Thus, the contents of an electronic book can be prepared in a short term. Further, since the position of the main-text images is aligned when the electronic book is viewed in a viewer, uncomfortableness to a user can be eliminated.

BRIEF DESCRIPTION OF DRAWINGS

Other and further objects, features, and advantages of the invention will be more explicit from the following detailed description taken with reference to the drawings wherein:

FIG. 2 is a flow chart showing the image processing method of the image processing apparatus 1a.

FIG. 4 is a graph for describing a step S22.

FIG. 5 is a graph for describing a step S23.

BEST MODE FOR CARRYING OUT THE INVENTION

Figure 1:
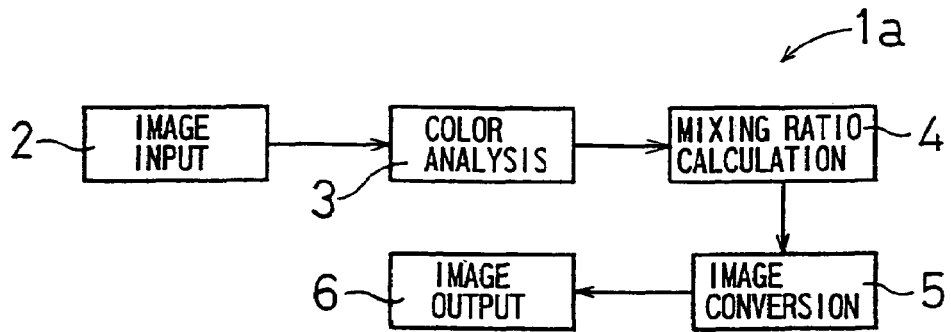
FIG. 1 is a block diagram of an image processing apparatus 1a in accordance with a first embodiment of the invention.

Now referring to the drawings, preferred embodiments of the invention are described below.

FIRST EMBODIMENT

FIG. 1 is a block diagram of an image processing apparatus 1a in accordance with a first embodiment of the invention. The image processing apparatus 1a comprises an image inputting section 2, a color analyzing section 3, a mixing-ratio calculating section 4, an image converting section 5, and an image outputting section 6. The image inputting section 2 reads an original image, for example, an image of a cartoon journal, in a predetermined unit, such as a spread and a page, and inputs it to the color analyzing section 3. The color analyzing section 3 analyzes the color used in the input image. The mixing-ratio calculating section 4 determines the mixing-ratio r:g:b of the respective color components of red (R), green (G), and blue (B). The image converting section 5 mixes the color components of R, G and B based on the determined mixing-ratio, thereby converting the input image into a monochromatic image. The image outputting section 6 outputs the converted image.

The image inputting section 2 is implemented by an image reading apparatus, such as a scanner, a copying machine, and a camera. It may also be implemented by an apparatus for reading an image from an medium, such as a CD-ROM (compact disk-read only memory), a hard disk, a floppy disk and a magneto-optical disk, which contains an image previously read from an original, as well as by a semiconductor memory.

The image outputting section 6 is implemented by an image displaying apparatus, such as a CRT (cathode ray tube) and an LCD (liquid crystal display). It may also be an image printing apparatus such as a printer. Further, it may also be implemented by an apparatus for writing out an image on an medium, such as a CD-ROM, a hard disk, a floppy disk and a magneto-optical disk, as well as by a semiconductor memory.

The color analyzing section 3, the mixing-ratio calculating section 4 and the image converting section 5 are implemented, for example, by a computer and a software.

Figure 2:
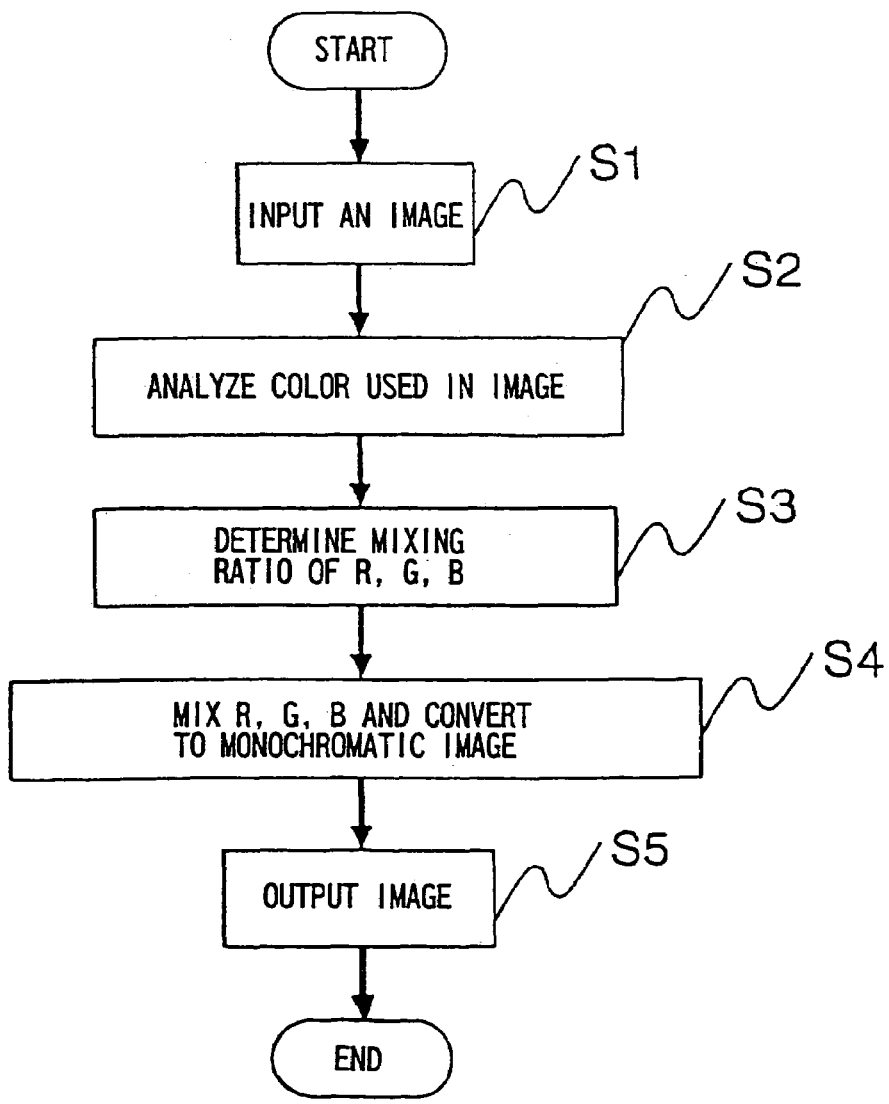

FIG. 2 is a flow chart showing the image processing method of the image processing apparatus 1a. The image inputting section 2 inputs an original image in a predetermined unit (S1). The color analyzing section 3 analyzes the color used in the input image (S2). The mixing-ratio calculating section 4 determines the mixing-ratio r:g:b of the respective color components of R, G and B (S3). The image converting section 5 mixes the color components of R, G and B according to the mixing-ratio, thereby converting the input image to a monochromatic image (S4). The image outputting section 6 outputs the converted image (S5).

Figure 3:
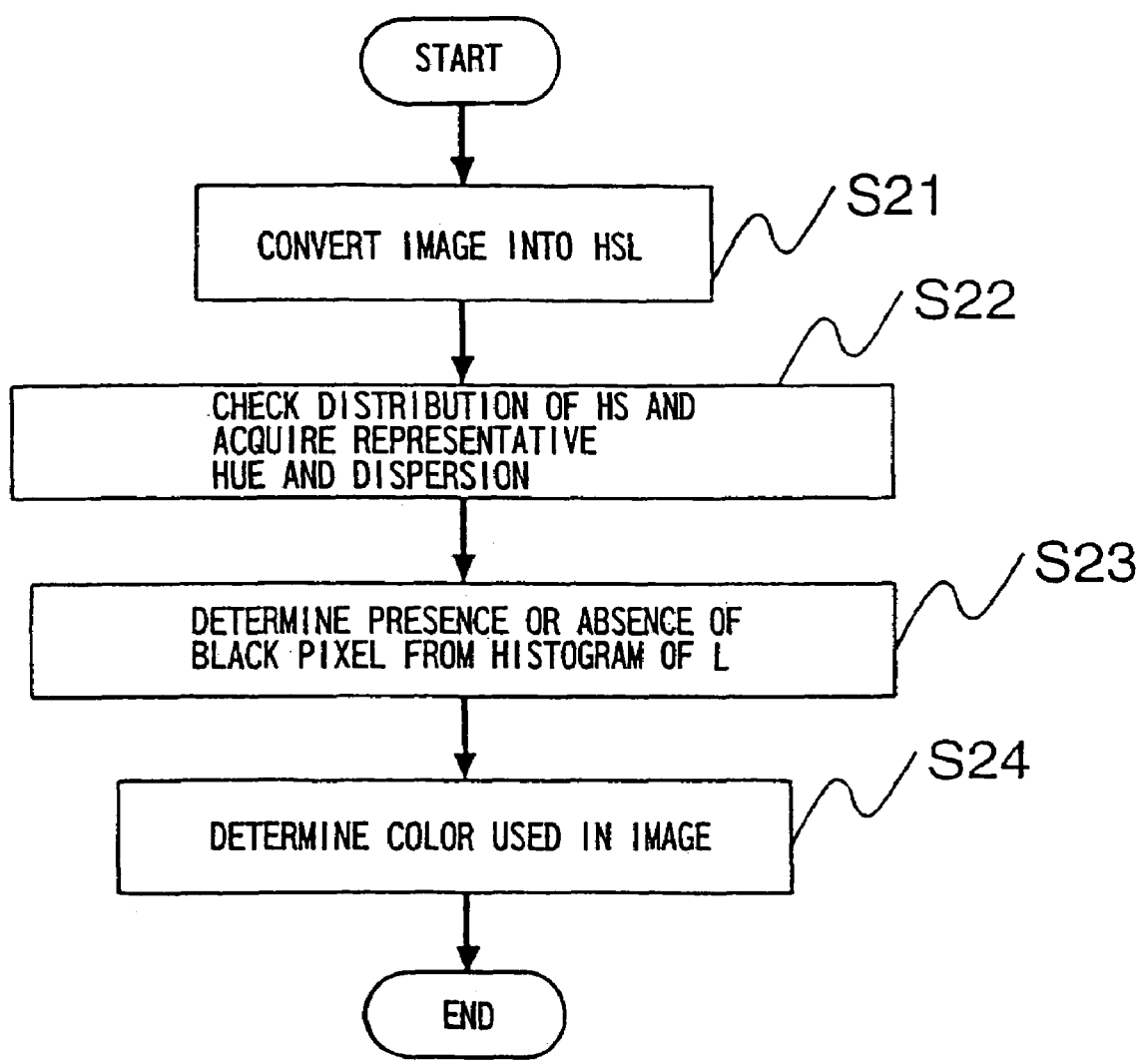
FIG. 3 is a flow chart for describing a color analyzing section 3.

FIG. 3 is a flow chart for describing the color analyzing section 3. The color analyzing section 3 converts the input image in a predetermined unit into hue (H), saturation (S) and lightness (L) (S21). The conversion of the input image into H, S and L can be carried out by a well known method (description is omitted). Then, the representative hue and the dispersion are obtained from the distribution of H and S(S22). Then, the presence or absence of a black pixel is determined from the histogram of L (S23), thereby determining the color used in the image (S24).

FIG. 4 is a graph for describing the step S22. FIG. 4(a) is a graph having a horizontal axis indicating hue (H) and a vertical axis indicating the sum of saturation (S). The sum of S is defined by the sum of the values of S of all the pixels having an identical value of H. It is shown as a histogram weighted by S in order to obtain the color used in the image. Selecting the H giving the maximum of the sum of S, let it be the representative hue H0. When the sum of S at H0 is less than or equal to a predetermined value, the input image is determined as an originally monochromatic image, and the representative hue H0 is determined as absent.

Using the relation H±2π=H, the sum of S is transformed so that the sum of S distributes in a range of H0±2π, thereby obtaining the dispersion V. When the dispersion V is greater than or equal to a predetermined value, it is determined that a plurality of colors are used in the input image. Otherwise, it is determined that the representative hue H0 alone is used.

FIG. 5 is a graph for describing the step S23. When a histogram of lightness (L) is prepared in 256 steps, black not being used decreases the low lightness pixels as shown in FIG. 5(a), and black being used increases the low lightness pixels as shown in FIG. 5(b). Accordingly, whether black is used or not can be determined depending on whether the distribution of the pixels in a low lightness range is within a predetermined range or not.

Figure 6:
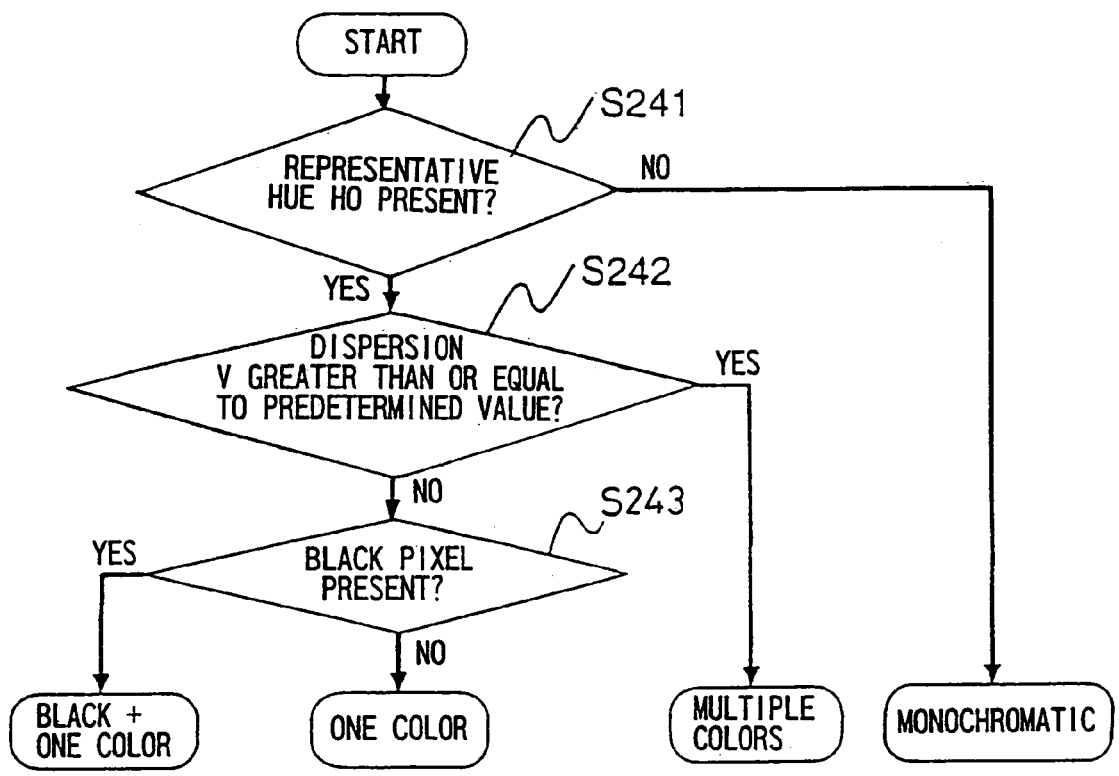
FIG. 6 is a graph for describing a step S24.

FIG. 6 is a graph for describing the step S24. When the representative hue H0 is absent, the input image is determined as a monochromatic image (S241). When the dispersion V obtained in the step S22 is greater than or equal to a predetermined value, it is determined that a plurality of colors are used in the input image (S242). Otherwise, the input image is determine as a monochromatic image in a color other than black if a black pixel is absent, and the input image is determine as an image in black plus another one color if a black pixel is present (S243).

Using the representative hue H0, the color used in the image is determined as follows. First, determine which of 0, π/3, 2π/3, π, 4π/3, 5π/3 and 2π is the closest to H0. Here, H0 is assumed to be within the range of 0-2. It is respectively determined as red (R) for 0 and 2π, yellow (Y) for π/3, green (G) for 2π/3, cyan (C) for π, blue (B) for 4π/3 and magenta (M) for 5π/3.

The mixing-ratio calculating section 4 is described below. The mixing-ratio calculating section 4 determines the mixing-ratio r:g:b of the R, G and B components based on the analysis result of the color analyzing section 3. That is, it changes the mixing-ratio correspondingly to the color used in the image.

When the color analyzing section 3 determines as a monochromatic image, r=0, g=1 and b=0 are used, for example. In a monochromatic image, there is no difference in R, G and B components, and hence, any of the r, g and b may be unity. Further, all of them may be an identical value.

When the color analyzing section 3 determines as plural colors, r=0.299, g=0.587 and b=0.114 are used similarly in an ordinary color/monochromatic conversion. Using such a mixing-ratio, a full-color image such as a photographic image can be converted to a naturally monochromatic image.

When the color analyzing section 3 determines as a single color other than black, the mixing-ratio is assigned by the ratio of the color components of the complimentary color of the color used in the image which is obtained and inputted by the color analyzing section 3. Here, the complimentary color is the color which becomes white when mixed with that color. For example, when the color used in the input image is red (R), its complimentary color is cyan (C). Since the ratio of the R, G and B components of cyan is 0:1:1, required mixing-ratio becomes r=0, g=0.5 and b=0.5. By mixing the R, G and B in such a mixing-ratio the conversion to a monochromatic image is achieved with the highest contrast of the image.

When the color analyzing section 3 determines as black plus one color other than black, the mixing-ratio is assigned by the ratio of the color components of the complimentary color of the color used in the image obtained by the color analyzing section 3, with adjustment by the ratio of the color components used in the image. For example, when the colors used in the input image are red (R) and black, the ratio of the color components of red (R) is 1:0:0, and the ratio of the R, G and B components of cyan (C) which is the complimentary color of red is 0:1:1. In order to set the red between black and white for the distinction between red and black, the ration of red is reduced to the half of the ratio of cyan, and added. Therefore, required mixing-ratio r:g:b becomes r=0.2, g=0.4 and b=0.4. Here, the ratio between the color used and its complimentary color is set to 1:2, however, the ratio may be changed based on the color used.

By being previously provided with a mixing-ratio table containing the optimum mixing-ratio for each of the above-mentioned colors and color combinations, the mixing-ratio calculating section 4 may merely refer to the mixing-ratio table. This avoids the necessity of calculating every time, thereby speeding up the process.

Further, in the case where the image conversion is performed image by image and that each of the images has a bias in color, the result of the image conversion sometimes differs, which causes uncomfortableness in turning over the leaf of the electronic book viewed in a portable terminal such as a viewer. Thus, a plurality of images may be converted as a whole. Specifically, the image inputting section 2 inputs a plurality of images, and the color analyzing section 3 analyzes the color from the result of the integration of the color used in each image from among the plurality of images. The mixing-ratio calculating section 4 calculates a mixing-ratio common to all the input images, and the image converting section 5 converts all the images in the same mixing-ratio. Accordingly, images can be converted to monochromatic images more stably.

Finally, the image converting section 5 converts each pixel into a monochromatic image $M_0$ based on the conversion formula $$M_0 = r\ R + g\ G + b\ B \text{ (where } r+g+b=1),$$

using the mixing-ratio r:g:b of the respective R, G and B color components determined by the mixing-ratio calculating section 4.

SECOND EMBODIMENT

Figure 7:
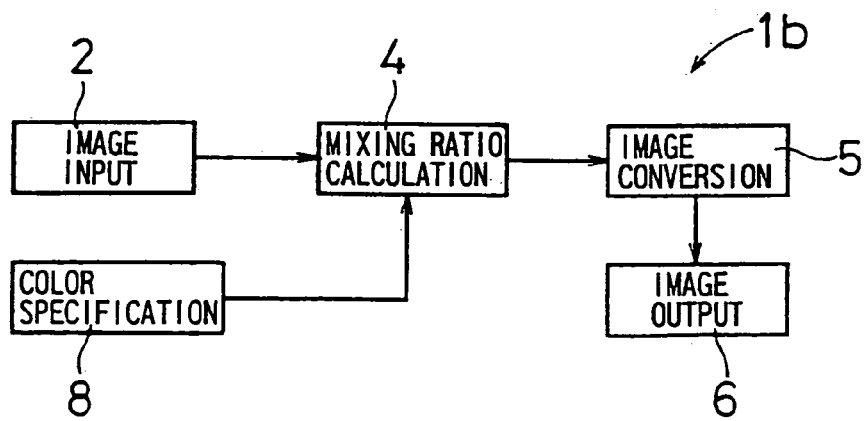
FIG. 7 is a block diagram of an image processing apparatus 1b in accordance with a second embodiment of the invention.

FIG. 7 is a block diagram of an image processing apparatus 1b in accordance with a second embodiment of the invention. The image processing apparatus 1b comprises an image inputting section 2, a mixing-ratio calculating section 4, an image converting section 5, an image outputting section 6 and a color specifying section 8. The image inputting section 2, the mixing-ratio calculating section 4, the image converting section 5, and the image outputting section 6 are identical to those of the above-mentioned image processing apparatus 1a, and hence, the description is omitted. The color specifying section 8 specifies the color used in the input image.

Figure 8:
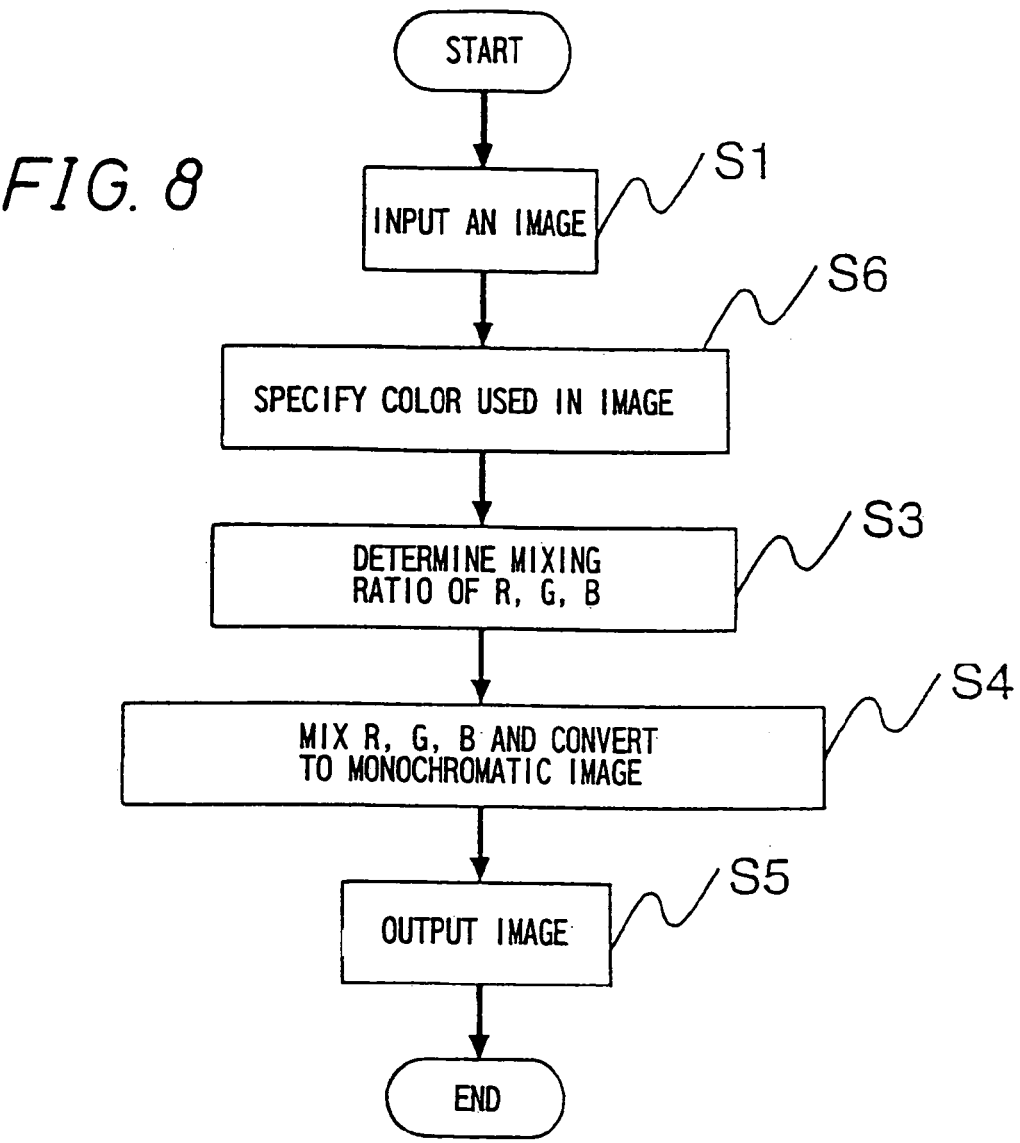
FIG. 8 is a flow chart showing the image processing method of the image processing apparatus 1b.

FIG. 8 is a flow chart showing the image processing method of the image processing apparatus 1b. The image inputting section 2 inputs an image (S1). The color specifying section specifies the color used in the input image (S6). The mixing-ratio calculating section 4 determines the mixing-ratio r:g:b of the respective color components of R, G and B (S3). The image converting section 5 mixes the color components of R, G and B according to the mixing-ratio, thereby converting the input image to a monochromatic image (S4). The image outputting section 6 outputs the image (S5).

The difference from FIG. 2 of the first embodiment is only the point that the step S2 is replaced by the step S6. In contrast to the image processing apparatus 1a automatically determining the color used in the input image, the image processing apparatus 1b semi-automatically determines it by a user externally specifying it through the color specifying section 8 implemented by a mouse or a keyboard.

The color specifying section 8 is described below. The color specifying section 8 permits a user to select the kind of the image from the group consisting of monochromatic, plural colors, one color other than black, and black plus one color other than black. When one color other than black or black plus one color other than black is selected, the color other than black is further selected from the group consisting of red (R), yellow (Y), green (G), cyan (C), blue (B) and magenta (M). Accordingly, by a user specifying the determination of the color, the image can be determined more accurately to be converted to a monochromatic image.

THIRD EMBODIMENT

Figure 9:
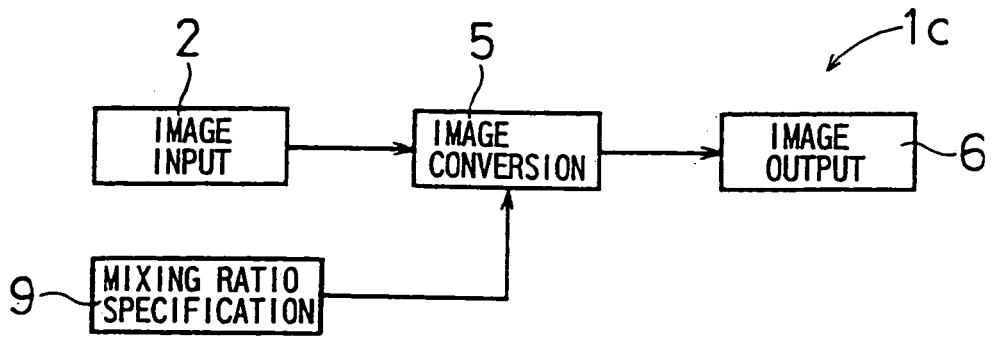
FIG. 9 is a block diagram of an image processing apparatus 1c in accordance with a third embodiment of the invention.
Figure 10:
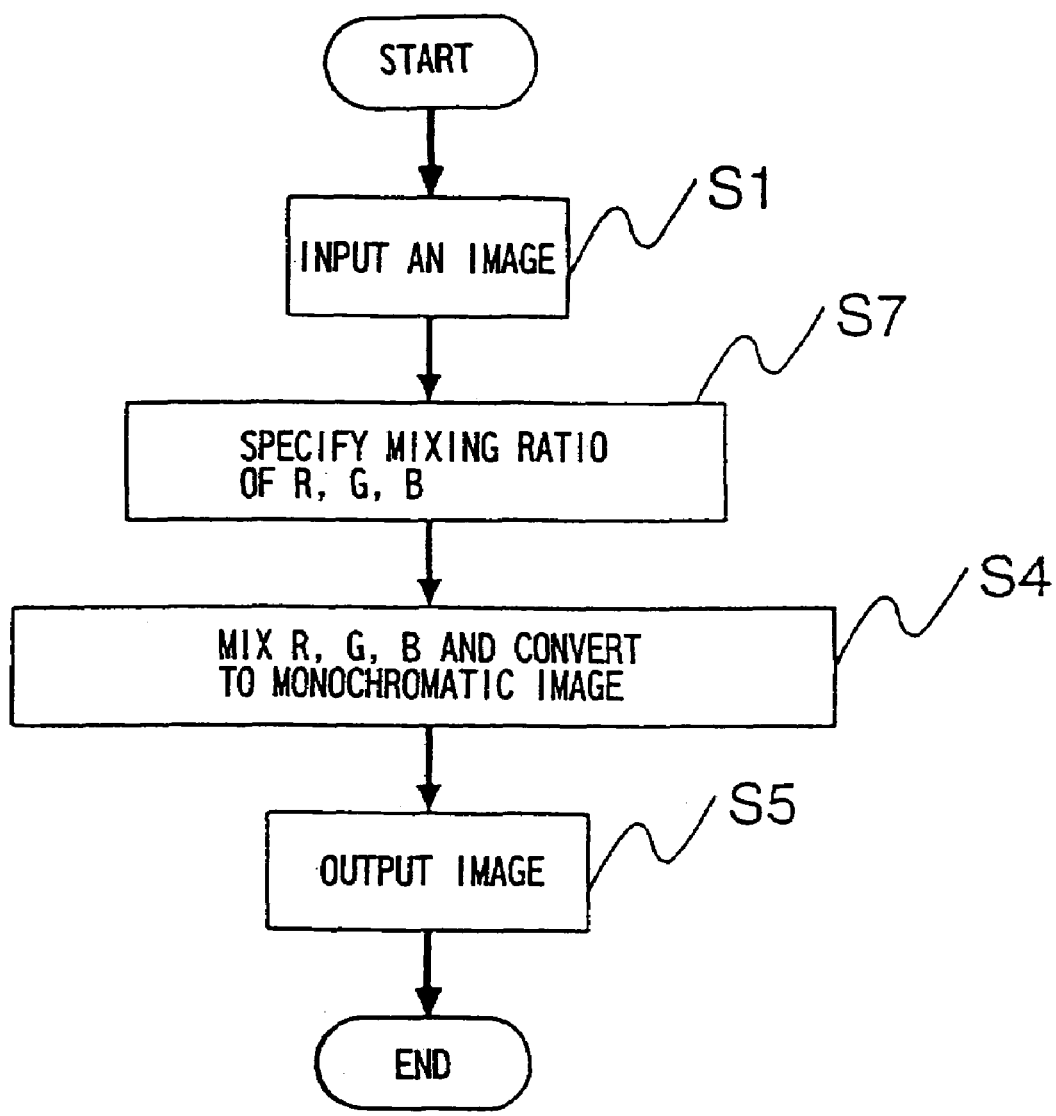
FIG. 10 is a flow chart showing the image processing method of the image processing apparatus 1c.

FIG. 9 is a block diagram of an image processing apparatus 1c in accordance with a third embodiment of the invention. The image processing apparatus 1c comprises an image inputting section 2, an image converting section 5, an image outputting section 6 and a mixing-ratio specifying section 9. The image inputting section 2, the image converting section 5, and the image outputting section 6 are identical to those of the above-mentioned image processing apparatus 1a, and hence, the description is omitted. The mixing-ratio specifying section 9 specifies the mixing-ratio r:g:b of the respective color components of R, G and B.

FIG. 8 is a flow chart showing the image processing method of the image processing apparatus 1b. The image inputting section 2 inputs an image (S1). The mixing-ratio specifying section 9 specifies the mixing-ratio r:g:b of the respective color components of R, G and B (S7). The image converting section 5 mixes the color components of R, G and B according to the mixing-ratio, thereby converting the input image to a monochromatic image (S4). The image outputting section 6 outputs the image (S5).

The difference from FIG. 2 of the first embodiment is only the point that the steps S2 and S3 are replaced by the step S7. In contrast to the image processing apparatus 1a automatically determining the color used in the input image and automatically determining also the mixing-ratio, the image processing apparatus 1c semi-automatically determines the mixing-ratio by a user externally specifying the mixing-ratio of the color components through the mixing-ratio specifying section 9 implemented by a mouse or a keyboard.

The mixing-ratio specifying section 9 is described below. The mixing-ratio specifying section 9 permits a user to select the mixing-ratio r:g:b of the R, G and B components. Accordingly, the color components can be mixed in the ratio desired by a user, resulting in a desirable monochromatic image.

The processes shown in the first to the third embodiments are implemented with a program. The program may be recorded on a computer-readable recording medium, such as an optical disk and a floppy disk, to be used after being read out when necessary. An image processing apparatus and an image processing method each for such a process are also included within the scope of the invention.

FOURTH EMBODIMENT

Figure 11:
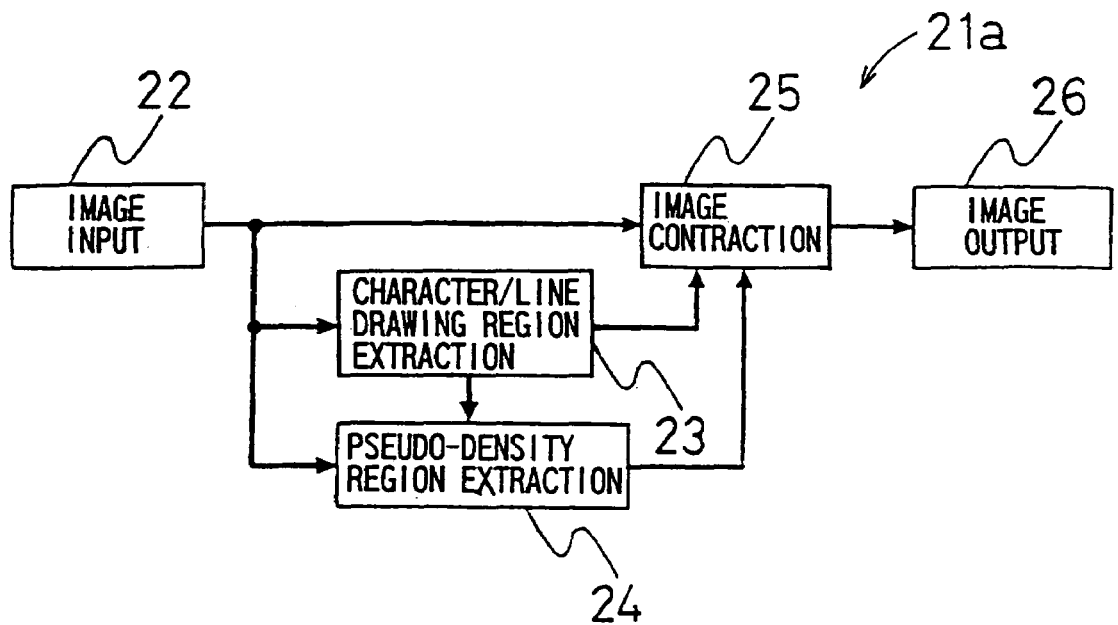
FIG. 11 is a block diagram of an image processing apparatus 21a in accordance with a fourth embodiment of the invention.

FIG. 11 is a block diagram of an image processing apparatus 21a in accordance with a fourth embodiment of the invention. The image processing apparatus 21a comprises an image inputting section 22, a character/line drawing region extracting section 23, a pseudo-density region extracting section 24, an image contracting section 25, and an image outputting section 26. The image inputting section 22 inputs an image. The character/line drawing region extracting section 23 extracts a character/line drawing region. The pseudo-density region extracting section 24 extracts a pseudo-density region from the input image and the extracted results of the character/line drawing region extracting section 23. The image contracting section 25 performs a contracting process by different methods respectively in the character/line drawing region, the pseudo-density region and the region other than the character/line drawing region and the pseudo-density region. The image outputting section 26 outputs the processed image.

The image inputting section 22 and the image outputting section 26 are implemented similarly to the image inputting section 2 and the image outputting section 6, respectively.

The character/line drawing region extracting section 23 performs a smoothing process on the input image, and then performs edge extraction thereof. The smoothing process permits to extract the edge component alone of a character and a line drawing after accurately eliminating the pseudo-density region even when the line drawing exists within a pseudo-density region. In the smoothing process, a filter such as $$\begin{bmatrix} 1/25 & 1/25 & 1/25 & 1/25 & 1/25 \\ 1/25 & 1/25 & 1/25 & 1/25 & 1/25 \\ 1/25 & 1/25 & 1/25 & 1/25 & 1/25 \\ 1/25 & 1/25 & 1/25 & 1/25 & 1/25 \\ 1/25 & 1/25 & 1/25 & 1/25 & 1/25 \end{bmatrix} \quad (2)$$

is used to simply average the pixel density in the periphery. Although the size of the filter is 5×5 here, it may be changed depending on the resolution of the original image. Further, the filter used may be a Gaussian filter and the like in which the central part and the peripheral part are differently weighted. In the edge extraction, two edge extracting filters such as $$\text{vertical edge} \begin{bmatrix} -1 & 0 & 1 \\ -1 & 0 & 1 \\ -1 & 0 & 1 \end{bmatrix} \quad (3)$$

and $$\text{horizontal edge} \begin{bmatrix} 1 & 1 & 1 \\ 0 & 0 & 0 \\ -1 & -1 & -1 \end{bmatrix} \quad (4)$$

are used to obtain the result of edge extraction which is defined by the sum of the absolute value of the output of each filter.

Using the result of the edge extraction, a pixel having a value exceeding a predetermined threshold value is determined as a character/line drawing region. An isolated point and the like among the pixels having a value exceeding the predetermined threshold value can be excluded from the character/line drawing region, considering it as a noise. A small region surrounded by edges can be included in a character region, because it can be considered as a complicated character area.

The pseudo-density region extracting section 24 is described below. The pseudo-density region extracting section 24 calculates the dispersion of the peripheral pixels, and extracts, as a pseudo-density region, the pixel which is one of the pixels having a large dispersion and is not included in the character/line drawing region extracted by the character/line drawing region extracting section 23. This depends on the fact that the pseudo-density region alone can be extracted by excluding the character/line drawing regions from the pixels having a large dispersion, because the dispersion is large both in a pseudo-density region and in the edge portion of the character/line drawing region.

Figure 12:
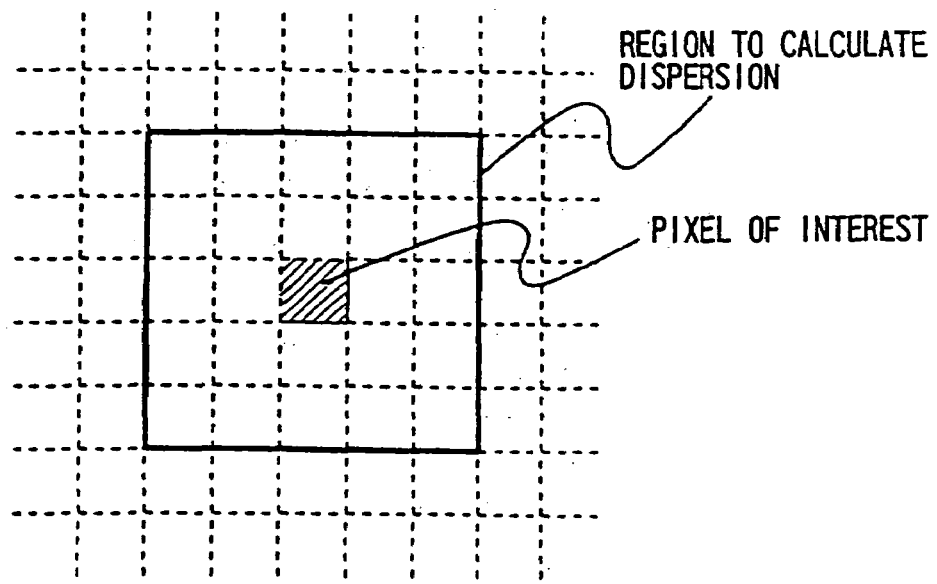
FIG. 12 is a diagram for describing the area in which the dispersion is calculated for a pixel of interest.

FIG. 12 is a diagram for describing the area in which the dispersion is calculated for a pixel of interest. In FIG. 12, the shaded portion is a pixel of interest, and the area surrounded by thick lines is the area to calculate the dispersion. Although the dispersion for each pixel is calculated in a 5×5 region in FIG. 12, the size of the region may be changed depending on the resolution of the original image. The dispersion for each pixel is obtained by $$\frac{\sum_{i=1}^{n}(p_i-m)^2}{n} \quad (5)$$

Here, $p_i$ is the pixel value, m is the average of the pixel density within the region to survey the dispersion, and n is the number of pixels included within the region to survey the dispersion.

The image contracting section 25 is described below. The image contracting section 25 contracts the pseudo-density region by a smoothing process, contracts the character/line drawing region by contraction due to an averaging process and by a subsequent edge enhancing process, and contracts the region other than the pseudo-density region and the character/line drawing region by the averaging process alone. Accordingly, a moire is prevented in the pseudo-density region. In the character/line drawing region, unclearness and blurring are prevented by the averaging process, and the clearness is kept by the edge enhancing process. In region other than the pseudo-density region and the character/line drawing region, the performing of the averaging process alone prevents unnecessary blurring by a smoothing process and the increase in noise by unnecessary edge enhancement. In the case where a character/line drawing region and a pseudo-density region are in the near vicinity, the averaging process and the edge enhancing process occurs in the near vicinity, whereby the image quality extremely changes. Thus, the boundary pixels may be set as a region other than the pseudo-density region and the character/line drawing region, whereby the image quality changes smoothly.

Figure 13:
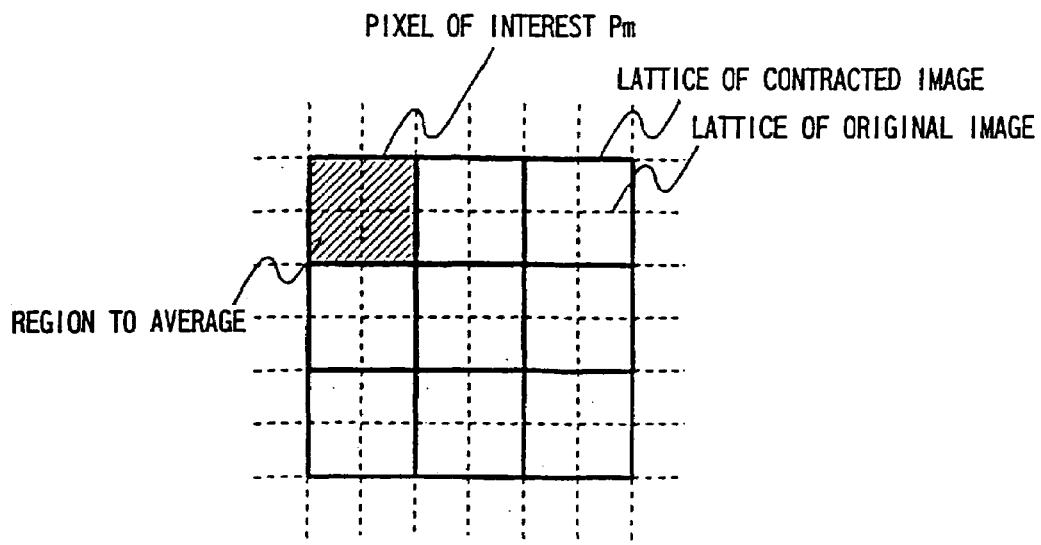
FIG. 13 is a diagram for describing a contracting process by averaging.

FIG. 13 is a diagram for describing the contracting process by averaging. In FIG. 13, the small lattice, which is shown by broken lines, is the lattice of the original image, and the large lattice shown by thick lines is the lattice of the contracted image. The contracted image is on a scale of ½ of the original image for simplicity, however, the scale is not necessarily a reciprocal number of a whole number. In the case where the scale is not a reciprocal number of a whole number, the lattices of the original image and the contracted image does not coincide. In that case, for example, a coordinate value may be rounded into a whole number, or a pixel may be averaged with a weight corresponding to the ratio of the areas common to the lattices. The pixel value of the pixel Pm of interest shown in FIG. 13 is obtained by averaging the shaded pixels.

Figure 14:
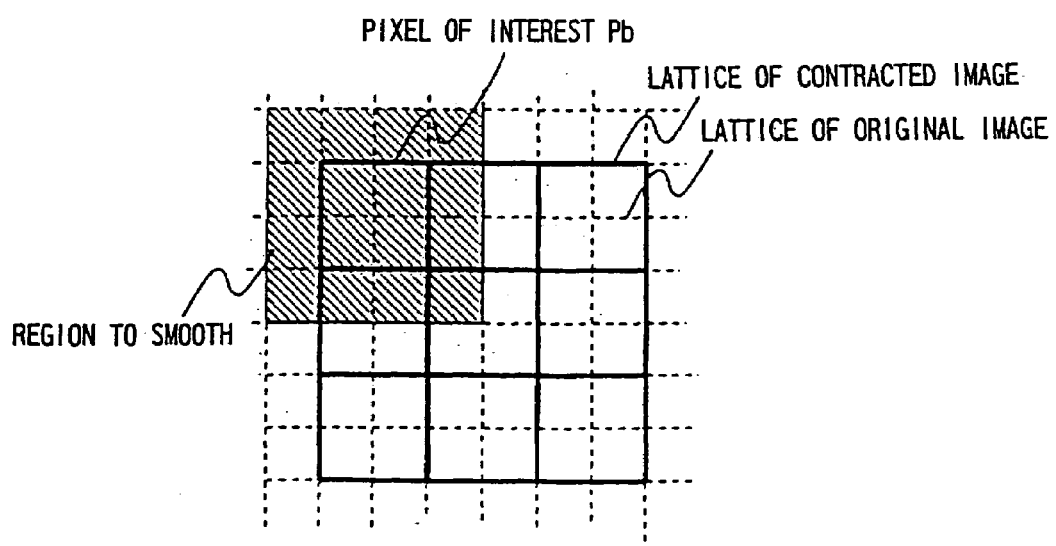
FIG. 14 is a diagram for describing a contracting process by smoothing.

FIG. 14 is a diagram for describing the contracting process by smoothing. In FIG. 14, a small lattice which is shown by broken lines is a lattice of the original image, and the large lattice shown by thick lines is the lattice of the contracted image. The pixel value of the pixel Pb of interest shown in FIG. 14 is obtained by averaging the shaded pixels which extend into the rather wider area than the lattice of the contracted image. The area to perform the smoothing may be changed depending on the contraction ratio and the resolution of the original image.

The edge enhancement is performed using a filter such as $$\begin{bmatrix} -1/8 & -1/8 & -1/8 \\ -1/8 & 2 & -1/8 \\ -1/8 & -1/8 & -1/8 \end{bmatrix} \quad (6)$$

Performing the edge enhancing process on the contracted image permits to clarify the dullness of the image due to the contraction by the averaging process.

FIFTH EMBODIMENT

Figure 15:
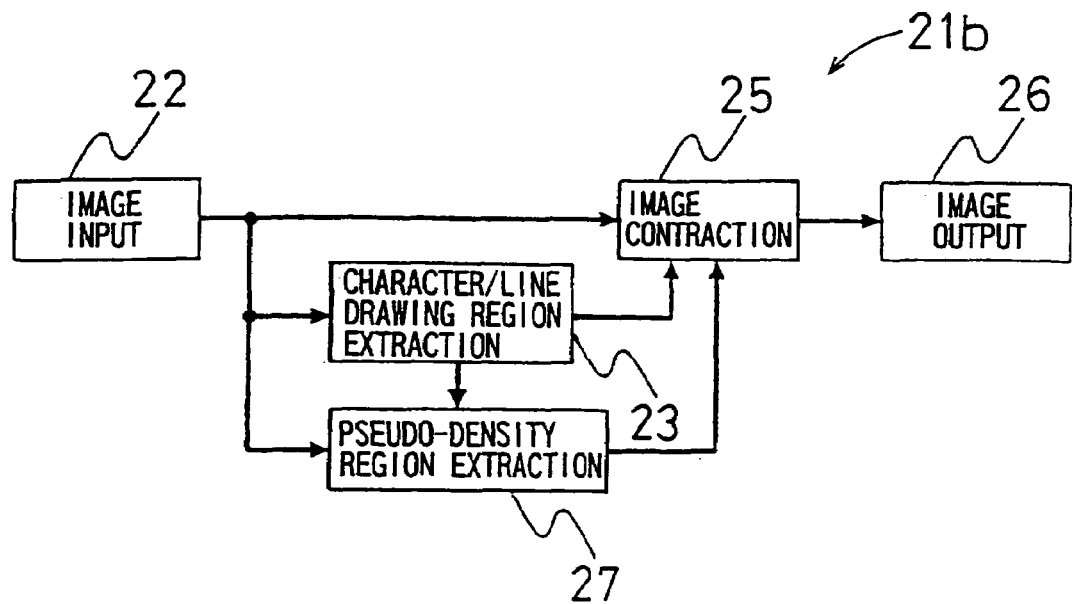
FIG. 15 is a block diagram of an image processing apparatus 21b in accordance with a fifth embodiment of the invention.

FIG. 15 is a block diagram of an image processing apparatus 21b in accordance with a fifth embodiment of the invention. The image processing apparatus 21b comprises an image inputting section 22, a character/line drawing region extracting section 23, an image contracting section 25, an image outputting section 26 and a pseudo-density region extracting section 27. The image inputting section 22 inputs an image. The character/line drawing region extracting section 23 extracts a character/line drawing region. The pseudo-density region extracting section 27 extracts a pseudo-density region from the input image and the results of the character/line drawing region extracting section 23. The image contracting section 25 performs a contracting process by different methods respectively in the character/line drawing region, the pseudo-density region and the region other than the character/line drawing region and the pseudo-density region. The image outputting section 26 outputs the processed image. The image inputting section 22, the character/line drawing region extracting section 23, the image contracting section 25 and the image outputting section 26 are implemented similarly to those of the image processing apparatus 21a, and hence, the description is omitted.

The pseudo-density region extracting section 27 calculates the correlation of the periphery of a pixel of interest and extracts, as a pseudo-density region, a pixel which is one of the pixels having a low correlation and is not included in the character/line drawing region extracted by the character/line drawing region extracting section 23. Since the pseudo-density region has a low correlation with the peripheral pixels, and since the edge portion has a large correlation in any of the vertical, horizontal and oblique directions, the probability is decreased that a character and a line drawing portion are classified into a pseudo-density region.

Figure 16:
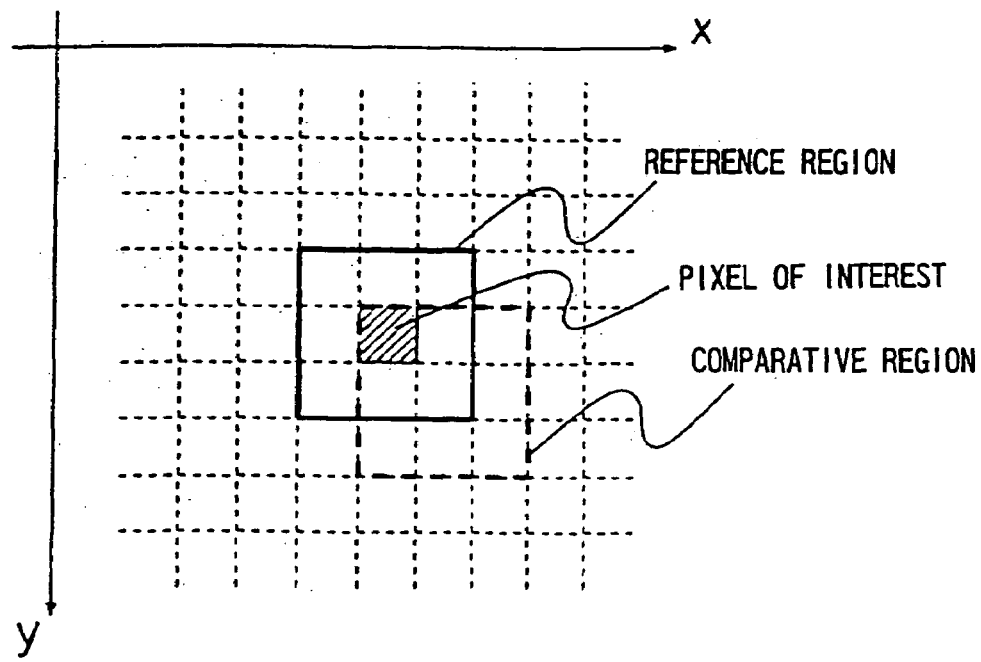
FIG. 16 is a diagram for describing the method of calculating the correlation of peripheral pixels.

FIG. 16 is a diagram for describing the method of calculating the correlation of peripheral pixels. First, a reference region which is a region containing a pixel of interest is defined. Comparative regions Bi (i=1, 2, 3, 4) each of which is a shifted region of the reference region A in any of the four of vertical, horizontal and oblique directions: (+1, 0), (+1, +1), (0, +1), (−1, −1) in (x, y) direction are defined. The value of correlation C for the pixel of interest is obtained by $$C = \mathrm{Min}\left(\frac{|A - Bi|}{n}\right) \quad (7)$$

Where |A−Bi| represents the total sum of the absolute values of the differences between the corresponding pixels in the regions A and B, n is the number of the pixels in the region, and Min indicates the minimum within i=1, . . . , 4. The image processing apparatus 21b calculates the value of correlation by the difference between the regions, however, the other methods may be used. A larger value of correlation C indicates a lower correlation, and a smaller value indicates a higher correlation. Since vertical, horizontal, and oblique lines has a large correlation in any of the above-mentioned four directions, they can be excluded from a pseudo-density region at an early stage, thereby permitting to extract a pseudo-density region more accurately.

The pseudo-density region extracting section 27 extracts, as a pseudo-density region, a pixel which is one of the pixels having an above-mentioned value of correlation greater than a predetermined value (having a low correlation) and is not extracted by the character/line drawing region extracting section 23. Accordingly, pseudo-density regions alone can be accurately extracted.

SIXTH EMBODIMENT

The image processing apparatus in accordance with a sixth embodiment is the image processing apparatus 21a of the fourth embodiment or the image processing apparatus 21b of the fifth embodiment with the pseudo-density region extracting sections 24, 27 changed. The other components are implemented similarly to those of the image processing apparatuses 21a, 21b of the fourth and the fifth embodiments, and hence, the description is omitted. The pseudo-density region extracting section of the image processing apparatus in accordance with the sixth embodiment detects the edge detection of an image and extracts, as a pseudo-density region, a pixel which is one of the pixels having a large edge value and is not included in the character/line drawing region extracted by the character/line drawing region extracting section 23. This depends on the fact that the pseudo-density region alone can be extracted by excluding the character/line drawing regions from the pixels having a large edge value, because the output of a edge detecting filter is large both in a pseudo-density region and in the edge portion of the character/line drawing region.

Figure 17:
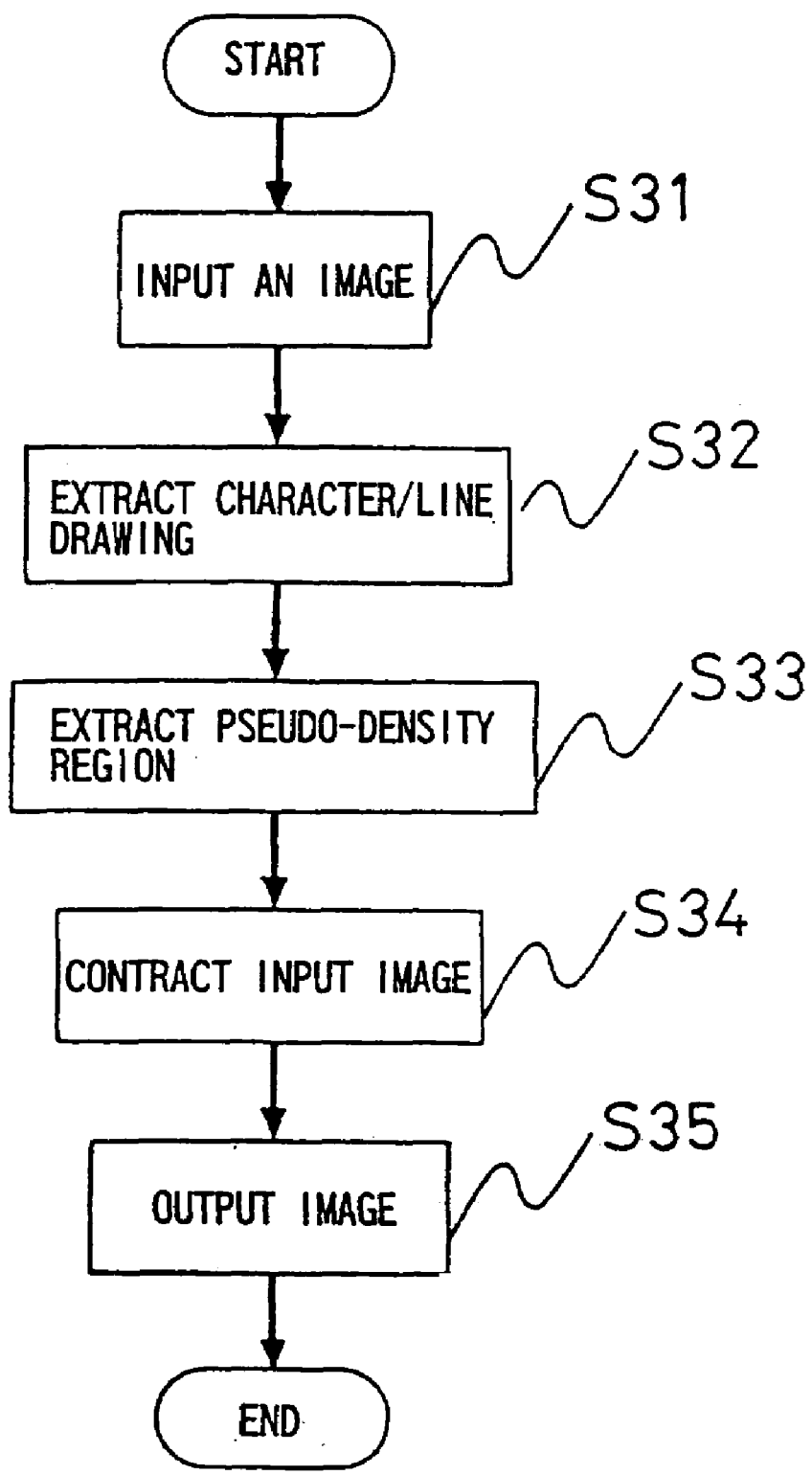
FIG. 17 is a flow chart showing the image processing method of the image processing apparatus in accordance with the seventeenth to the twenty-third inventions.

FIG. 17 is a flow chart showing the image processing method of the image processing apparatus in accordance with the seventeenth to the twenty-third inventions. A step S31 is a process module for inputting an image, that is, a process module for reading an image from an image inputting apparatus, such as a scanner, or a storage medium into a memory of the image contracting apparatus. A step 32 is a process module for extracting a character/line drawing region, and extracts the character/line drawing region by edge extraction after performing a smoothing process on the input image. A step S33 is a process module for extracting a pseudo-density region and extracts the pseudo-density region by the method described in the fourth, the fifth and the sixth embodiments. A step S34 is a process module for performing the image contracting process described in the fourth, the fifth and the sixth embodiments on the character/line drawing region and the pseudo-density region extracted by the process modules of the steps S32, S33. A step S35 is a process module for outputting the image contracted by the step S34 into the image outputting section 26.

Figure 18:
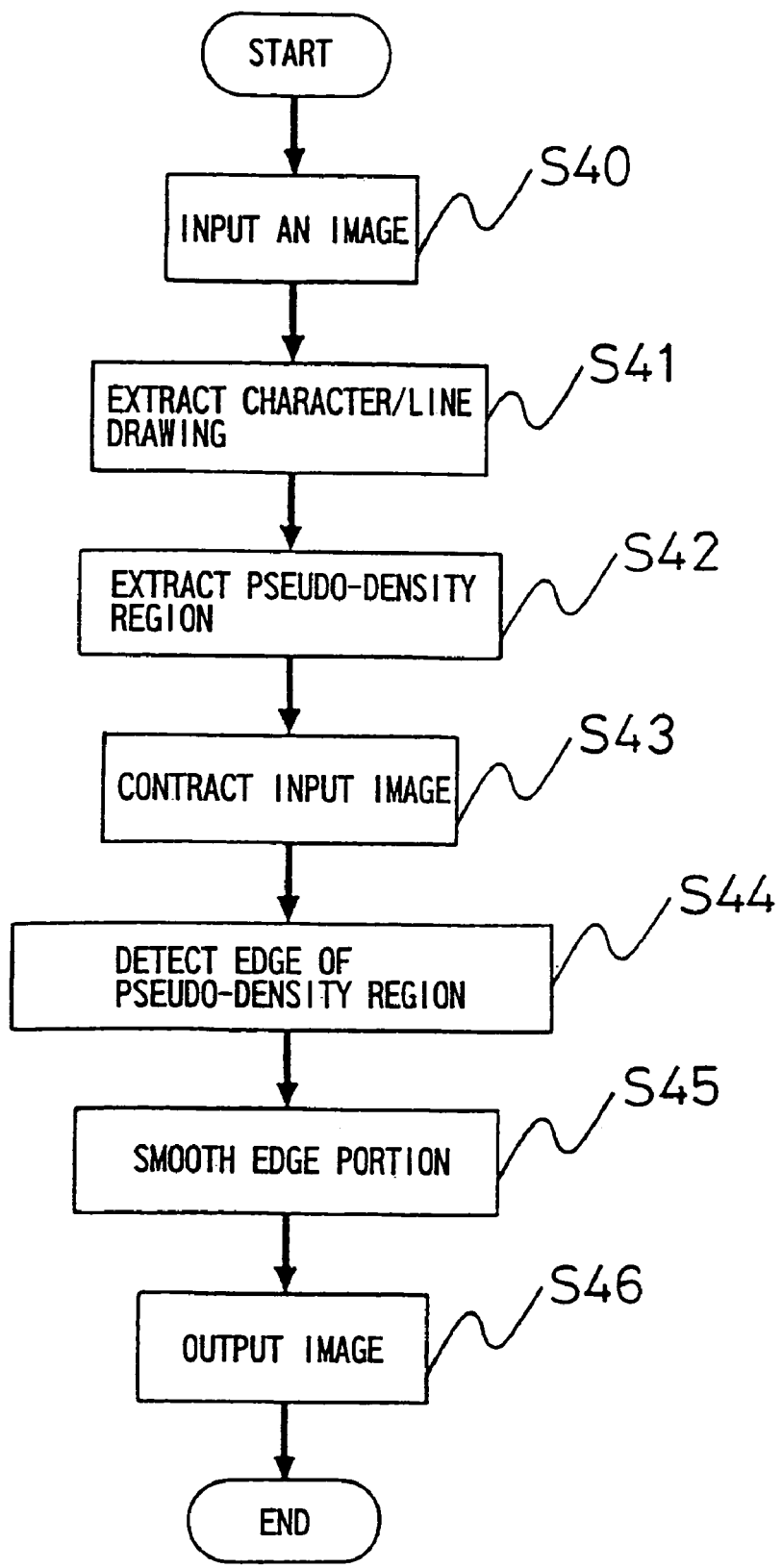
FIG. 18 is a flow chart showing the image processing method of the image processing apparatus in accordance with the twenty-fourth invention.

FIG. 18 is a flow chart showing the image processing method of the image processing apparatus in accordance with the twenty-fourth invention. Steps S40-S43 are process modules for performing the same processes as the steps S31-S34 of FIG. 17, and hence, the description is omitted. A step S44 detects an edge of a pseudo-density region already contracted. Since the pseudo-density region is processed by the smoothing process, the edge value normally should not be large. However, in the case of the occurrence of a moire, an edge should be detected.

A step S45 is a process module for performing the smoothing process only on the pixels (for example, 60) having an edge value which is detected by the step S44 and is greater than or equal to a predetermined value. Accordingly, it is characterized by performing the smoothing process on the contracted image. A step S46 is a process module for outputting the image, and performs the same process as the step S35.

Figure 19:
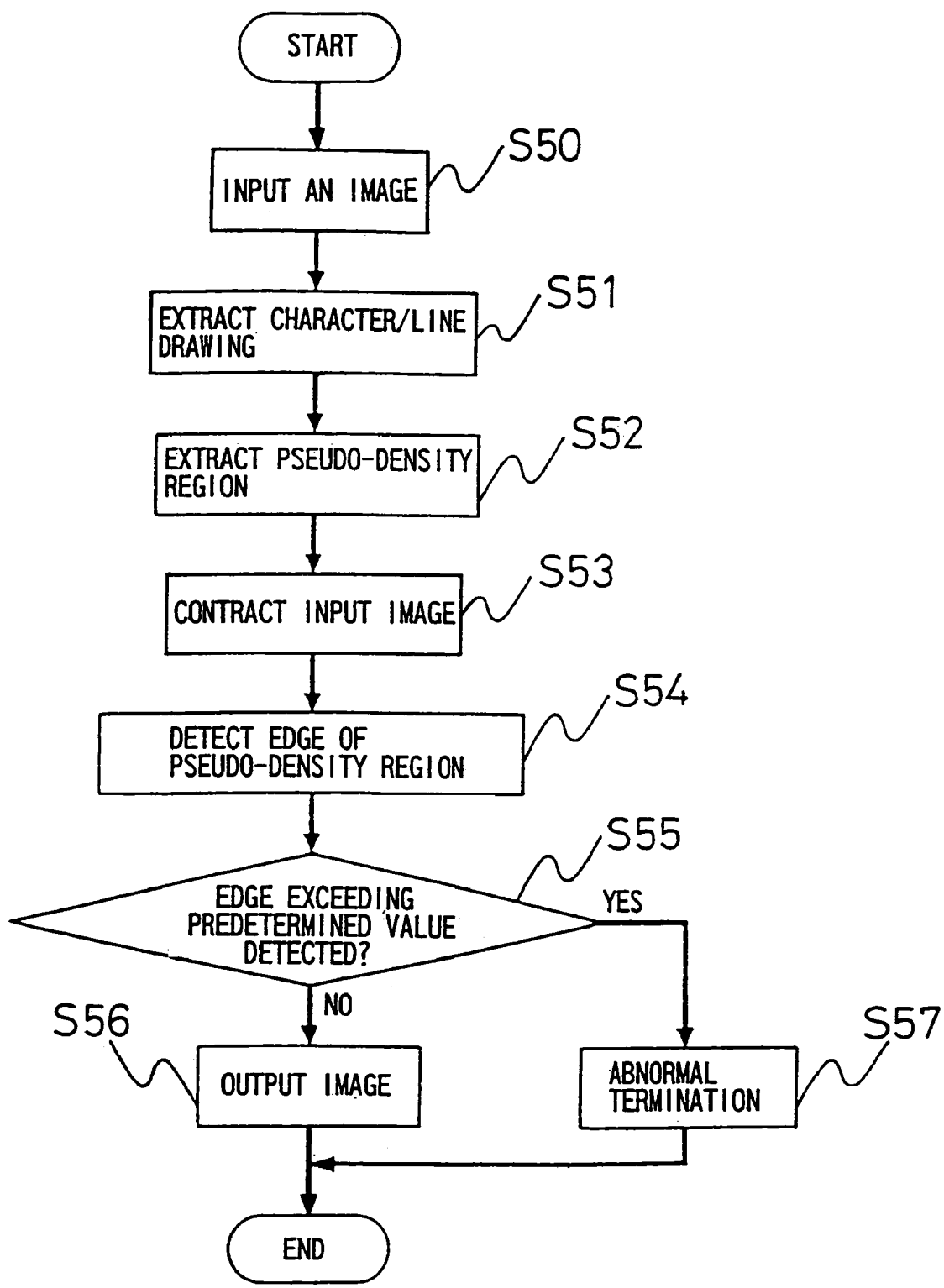
FIG. 19 is a flow chart showing the image processing method of the image processing apparatus in accordance with the twenty-fifth invention.

FIG. 19 is a flow chart showing the image processing method of the image processing apparatus in accordance with the twenty-fifth invention. Steps S50-S53 are process modules for performing the same processes as the steps S31-S34 of FIG. 17 and the steps S40-S43 of FIG. 18. A step S54 detects an edge of a pseudo-density region already contracted. Since the pseudo-density region is processed by the smoothing process, the edge value normally should not be large. However, in the case of the occurrence of a moire, an edge should be detected.

In the case where there exists a pixel (for example, 60) having an edge value which is detected by the step S54 and is greater than or equal to a predetermined value, a step S55 interrupts the contracting process, indicating the occurrence of a moire (step S57). It may merely generate the warning, in stead. In the case where there is not a pixel having an edge value greater than or equal to a predetermined value, the step S55 outputs the image and terminates (step S56).

SEVENTH EMBODIMENT

Figure 20:
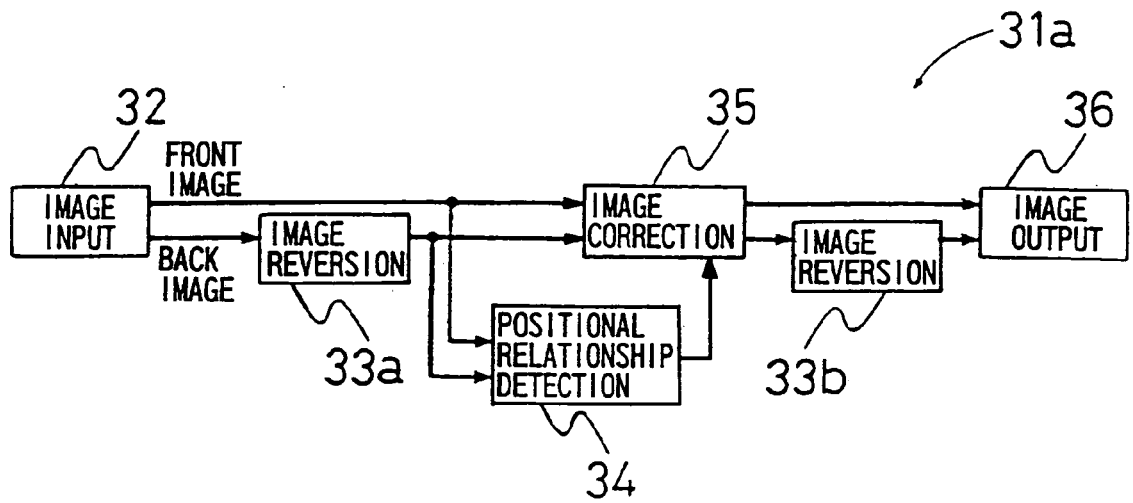
FIG. 20 is a block diagram of an image processing apparatus 31a in accordance with a seventh embodiment of the invention.

FIG. 20 is a block diagram of an image processing apparatus 31a in accordance with a seventh embodiment of the invention. The image processing apparatus 31a comprises an image inputting section 32, an image reversing sections 33a, 33b, a positional relationship detecting section 34, an image correcting section 35 and an image outputting section 36. The image inputting section 32 inputs the front and back images of an original. The first image reversing section 33a reverses the right and left of the back image alone. The positional relationship detecting section 34 detects the positional relationship between the front and back images. The image correcting section 35 eliminates a ghost image from each of the front and back images by a calculating process on the front and back images depending on the positional relationship of the front and back images. The second image reversing section 33b recovers the orientation of the back image by reverting again the right and left of the back image. The image outputting section 36 outputs the corrected front and back images. The output can be used as an electronic book. The image inputting section 32 and the image outputting section 36 can be implemented similarly to those of the image inputting section 2 and the image outputting section 6, and hence, the description is omitted.

The first image reversing section 33a reverses the right and left of the back image. The front image may be reversed. Since the image on the opposite side which causes a ghost image is in the reversed orientation of right and left, the back image is reversed before the calculating process by the positional relationship detecting section 34 and the image correcting section 35. After the correcting process, the corrected back image is reversed again by the second image reversing section 33b, thereby recovering the normal orientation. The image reversing sections 33a, 33b may have an identical configuration.

Figure 21:
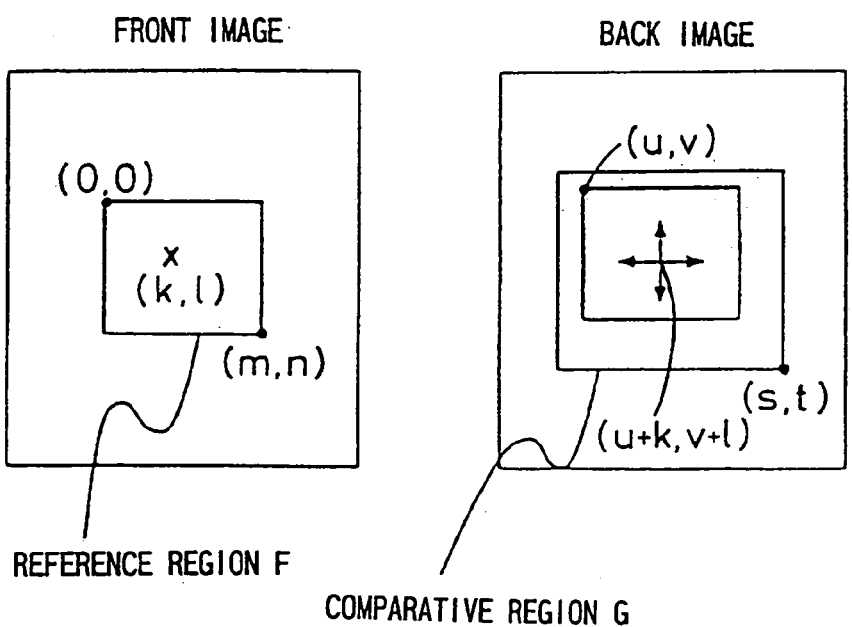
FIG. 21 is a diagram for describing a positional relationship detecting section 34.

FIG. 21 is a diagram for describing the positional relationship detecting section 34. The positional relationship detecting section 34 is implement, for example, by a block matching section. A reference region F having a size of (m×n) is defined on the front image side, and a comparative region G having a size of (s×t) larger than the reference region F is defined on the back image side. The comparative region G is compared with the reference region F thereby to obtain a region having the highest similarity to the reference region F. In other words, let the top left point of the reference region F be (0, 0), and any top left point of the comparative region G be (u, v). Then, the comparison between an arbitrary point (k, l) of the reference region F and the corresponding point (k+u, l+v) of the comparative region G is carried out by the following Formula (8).

$$d(u, v) = \sum_{k=0}^{n-1} \sum_{l=0}^{m-1} |G(k + u, l + v) - F(k, l)| \quad (8)$$

The region of the comparative region G which locates the position such that the point d(u, v) of the Formula (8) becomes minimum is determined as having the highest similarity to the reference region F, thereby detecting the coincidence of the comparative region G with the reference region F.

Knowing the positional relationship of the correspondence between the front and back images, the amount of the shift (0x, 0y) of the back image with respect to the front image can be obtained from the difference between the positions of the comparative region G and the reference region F.

In the embodiment, the block matching is carried out in one reference region F, thereby obtaining the amount of parallel displacement only. However, the block matching may be carried out in two or more reference regions F, thereby detecting also the amount of rotation.

Since a ghost image has very low brightness and contrast in comparison with the original image, there is an anxiety that the direct comparison between the front and back images during the block matching can results in a wrong detection of the position due to the strong influence of the original image on each side. Thus, the invention comprises high brightness component extracting means for previously extracting the high brightness component alone before the positional relationship detecting section 34, thereby performing the block matching using the high brightness component alone, thereby achieving more accurate detection of the position.

Figure 22:
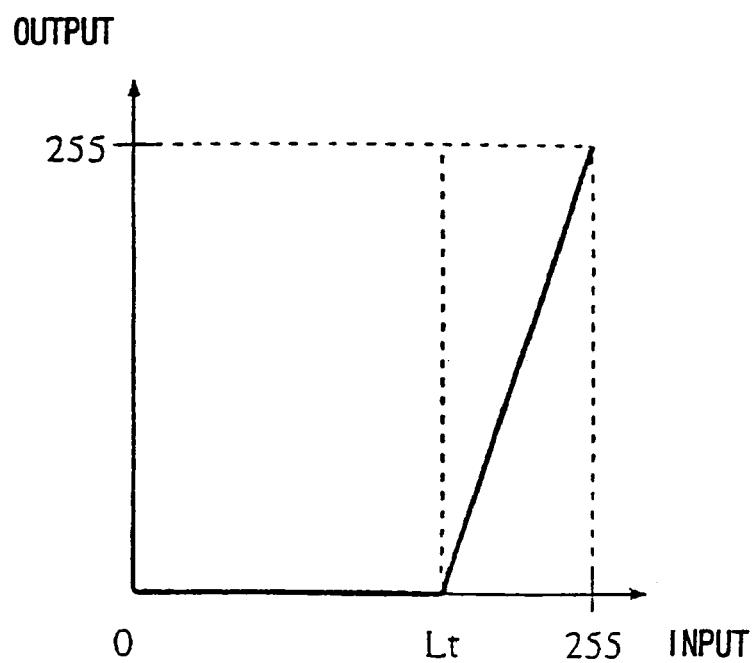
FIG. 22 is a graph for describing the mean for extracting a high brightness component.

FIG. 22 is a graph for describing the mean for extracting a high brightness component. In the graph of FIG. 22, the horizontal axis indicates the input pixel value, and the vertical axis indicates the output pixel value. In the graph of FIG. 22, the pixel value represents the brightness and has a value of 0-255. A value nearer to −0 is determined as a lower brightness (black), and a value nearer to 255 as a higher brightness (white). However, this relationship may be reversed, the value is not necessarily a whole number, and the range is not necessarily 0-255.

The means for extracting a high brightness component converts the pixel value alone of the input image having a pixel value greater than or equal to Lt into a value of 0-255, thereby cutting off a low brightness component to extract the high brightness component alone. The pixel value Lt is previously set to a value lower than the brightness of a ghost image component, and depends on the transmittance of an original sheet, the sensitivity characteristics of a scanner, and the like.

The operation of the image correcting section 35 is described below with reference to the following Formulae (9)-(12). The following a and b represent the actually printed front and back images, respectively. The A and B represent the front and back images, respectively, which are read by the image inputting section 32 and includes a ghost image. For the simplicity of description, a, b, A and B represent the respective pixel values corresponding to each other in an identical position. However, in practice, the corresponding pixels are determined by the positional relationship detecting section 34 considering a parallel displacement and a rotation.

$$A = a - r(255 - b) \quad (9)$$

$$B = b - r(255 - a) \quad (10)$$

$$a = \frac{A + r(255 - B) - 255r^2}{1 - r^2} \quad (11)$$

$$b = \frac{B + r(255 - A) - 255r^2}{1 - r^2} \quad (12)$$

The r represents the transmittance of the medium, such as an original sheet, on which the image is printed. It can be obtained by substituting the known or measured values for A, a and b in Formula (9).

The Formulae (9) and (10) are solved, resulting in Formulae (11) and (12). That is, by the calculating process of the photographed front image A and back image B, the actual front image a and back image b can be recovered eliminating a ghost image. The image correcting section 35 performs the calculation of the above-mentioned Formulae (11) and (12) and outputs the front image a and the back image b.

The image processing apparatus 31a can be implemented by a computer-readable recording medium, such as a floppy, a ROM and a CD, which records a program describing the process steps of the image reversing sections 33a, 33b, the positional relationship detecting section 34 and the image correcting section 35 described above.

EIGHTH EMBODIMENT

Figure 23:
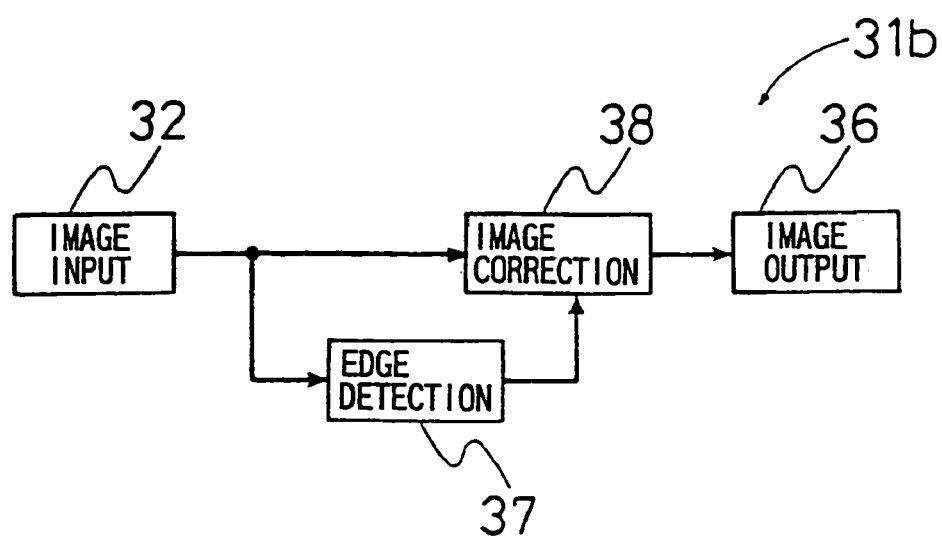
FIG. 23 is a block diagram of an image processing apparatus 31b in accordance with an eighth embodiment of the invention.

FIG. 23 is a block diagram of an image processing apparatus 31b in accordance with an eighth embodiment of the invention. The image processing apparatus 31b comprises an image inputting section 32, an image outputting section 36, an edge detecting section 37 and an image correcting section 38. The image inputting section 32 inputs an image. The edge detecting section 37 detects an edge. The image correcting section 38 eliminates a ghost image by raising the brightness of a pixel other than the edge and a low brightness region. The image outputting section 36 outputs the corrected image. The image inputting section 32 and the image outputting section 36 of the image processing apparatus 31b are implemented similarly to those of the image inputting section 32 and the image outputting section 36 of the image processing apparatus 31a, and hence, the description is omitted.

In the edge detection by the edge detecting section 37, two edge detection filters such as Equations (13) and (14) are used, and the result of the edge detection is defined by the sum of the absolute value of the outputs of the respective filters. Using the result of the edge detection, a pixel having a value exceeding a predetermined threshold value is determined as an edge.

$$\text{vertical edge} \begin{bmatrix} -1 & 0 & 1 \\ -1 & 0 & 1 \\ -1 & 0 & 1 \end{bmatrix} \quad (13)$$

$$\text{horizontal edge} \begin{bmatrix} 1 & 1 & 1 \\ 0 & 0 & 0 \\ -1 & -1 & -1 \end{bmatrix} \quad (14)$$

Figure 24:
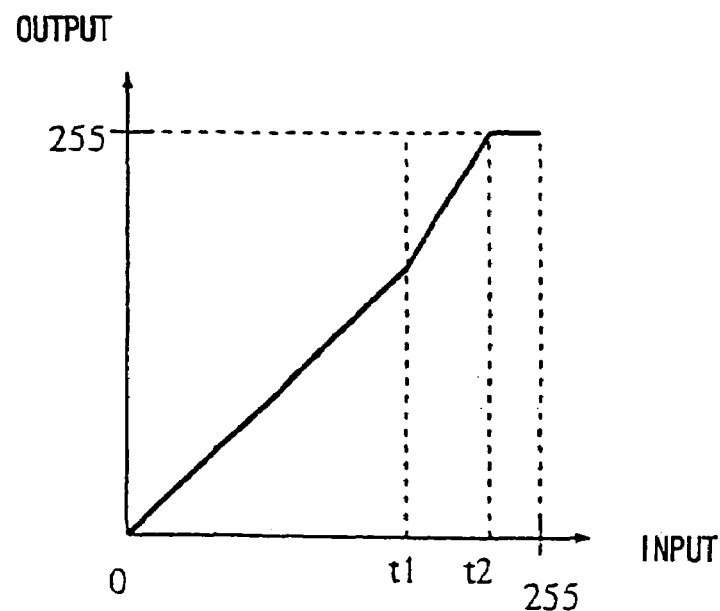
FIG. 24 is a graph for describing the operation of an image correcting section 38.

FIG. 24 is a graph for describing the operation of the image correcting section 38. Let the pixel value in the periphery of a ghost image component the input pixel value of which is previously known be t2, and a pixel value appropriately smaller than the pixel value t2 be t1. Then, the image correcting section 38 corrects a ghost image by changing the relationship (inclination) to the output pixel value between the pixel value t1 and the pixel value t2 to correct the output pixel value so as to saturate at the pixel value t2 and above. The pixel values t1, t2 depend on the transmittance of an original sheet, the sensitivity characteristics of a scanner, and the like. Here, since there is no influence on the low brightness component having a pixel value smaller than or equal to t1, the whitening-out of a black portion can be prevented. Further, the brightness correction is not carried out in the edge portion detected by the edge detecting section 37, whereby the high brightness portion in the contour of a character is conserved, whereby the unclearness of a character can be prevented.

The image processing apparatus 31b can be implemented by a computer-readable recording medium, such as a floppy, a ROM and a CD, which records a program describing the process steps of the edge detecting section 37 and the image correcting section 38 described above.

NINTH EMBODIMENT

Figure 25:
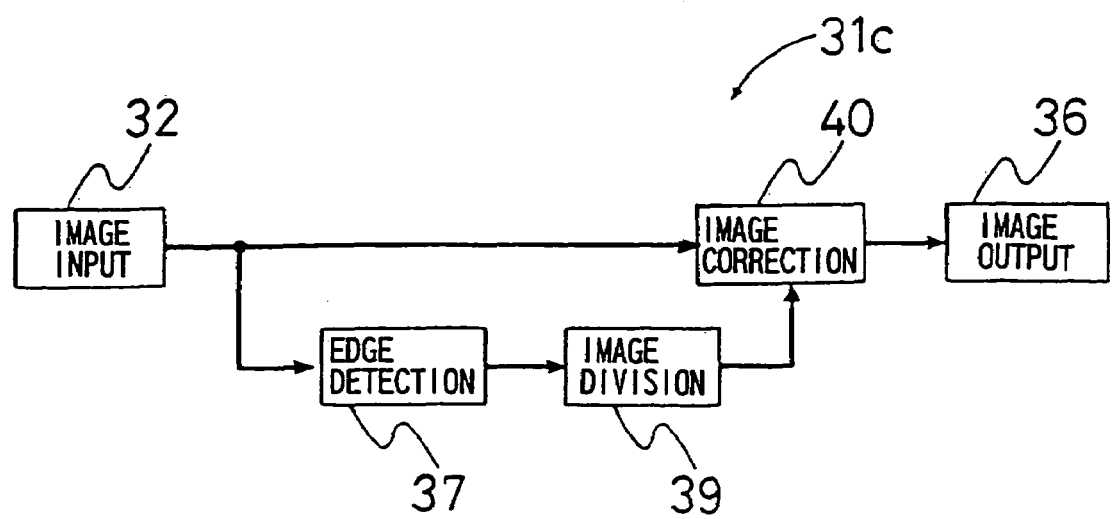
FIG. 25 is a block diagram of an image processing apparatus 31c in accordance with a ninth embodiment of the invention.

FIG. 25 is a block diagram of an image processing apparatus 31c in accordance with a ninth embodiment of the invention. The image processing apparatus 31c comprises an image inputting section 32, an image outputting section 36, an edge detecting section 37, an image dividing section 39 and an image correcting section 40. The image inputting section 32 inputs an image. The edge detecting section 37 detects an edge. The image dividing section 39 divides the image at the detected edge and low brightness component.

The image correcting section 40 eliminates a ghost image by raising the brightness of a portion having a high average brightness within the divided region. The image outputting section 36 outputs the corrected image. The image inputting section 32, the image outputting section 36 and the edge detecting section 37 of the image processing apparatus 31c are implemented similarly to those of the image inputting section 32, the image outputting section 36 and the edge detecting section 37 of the image processing apparatus 31b, and hence, the description is omitted.

Figure 26:
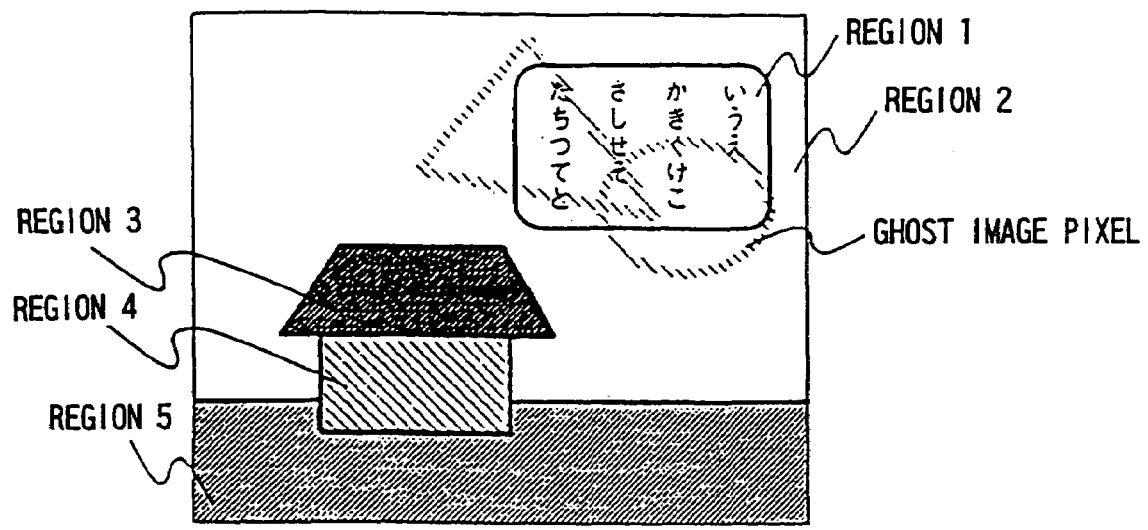
FIG. 26 is a diagram for describing the operation of an image dividing section 39.

The image dividing section 39 divides an image region based on the edge and the pixel value exceeding a predetermined threshold value detected by the edge detecting section 37. For example, as shown in FIG. 26, the image dividing section 39 divides the image into regions 1-5. The region 1 is a surrounded region having a character, the region 2 is a base region, the region 3 is a black halftone region, the region 4 is a thin halftone region, and the region 5 is a thick halftone region. Assume that the regions 1-5 does not include a black pixel or an edge portion, such as a character. Further assume that a ghost image having the same brightness as the region 4 exists in the regions 1 and 2. The regions 3-5 using a halftone screen have a low average brightness, however, the regions 1 and 2 have a high average brightness because of the white background. Accordingly, by performing a brightness correction in the high average brightness regions 1 and 2 alone, the ghost image in the regions 1 and 2 can be eliminated with the halftone in the region 4 preserved even when the regions 1 and 2 have a ghost image having the same brightness as the region 4. Accordingly, a black region in an image is excluded from the region to correct a ghost image because of the unremarkableness of a ghost image.

The image correcting section 40 calculates the average brightness in a region divided by the image dividing section 39, and corrects the brightness of a high brightness portion by the similar method of FIG. 24 described in the eighth embodiment only when the brightness is greater than or equal to a predetermined value, thereby eliminating a ghost image. As described above, by performing the ghost-image correction in high average brightness regions alone, even a halftone portion having the same brightness as a ghost image can be prevented from the whitening-out of the uniform region surrounded by lines. Further, since black regions and edge portions are excluded, the unclearness of a character and the whitening-out of a black portion are prevented.

Figure 27:
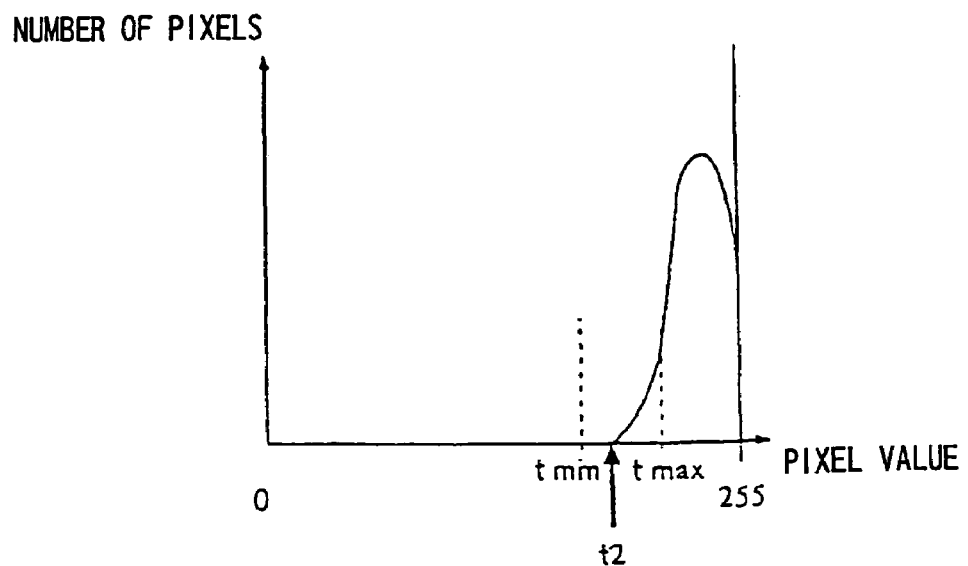
FIG. 27 is a graph for describing the method of calculating a pixel value t2.

The image correcting section 40 automatically calculates the pixel value t2 of the FIG. 24 from the distribution of the pixel values in a high brightness region. FIG. 27 is a graph for describing the method of calculating the pixel value t2. First, the histogram of the pixel values of a high brightness region is prepared, and pixel values tmin and tmax are defined. When all the pixels of the high brightness region exist in the right of tmax, set t2=tmax. When all the pixels of the high brightness region exist in the left of tmin, set t2=tmin. When the pixel having the minimum exists between tmin and tmax, let the value be the pixel value t2. Since a ghost image portion is darker than the peripheral region, the ghost image can be eliminated by detecting the pixel value and by correcting it so as to be white.

The image processing apparatus 31c can be implemented by a computer-readable recording medium, such as a floppy, a ROM and a CD, which records a program describing the process steps of the edge detecting section 37, image dividing section 39 and the image correcting section 40 described above.

TENTH EMBODIMENT

Figure 28:
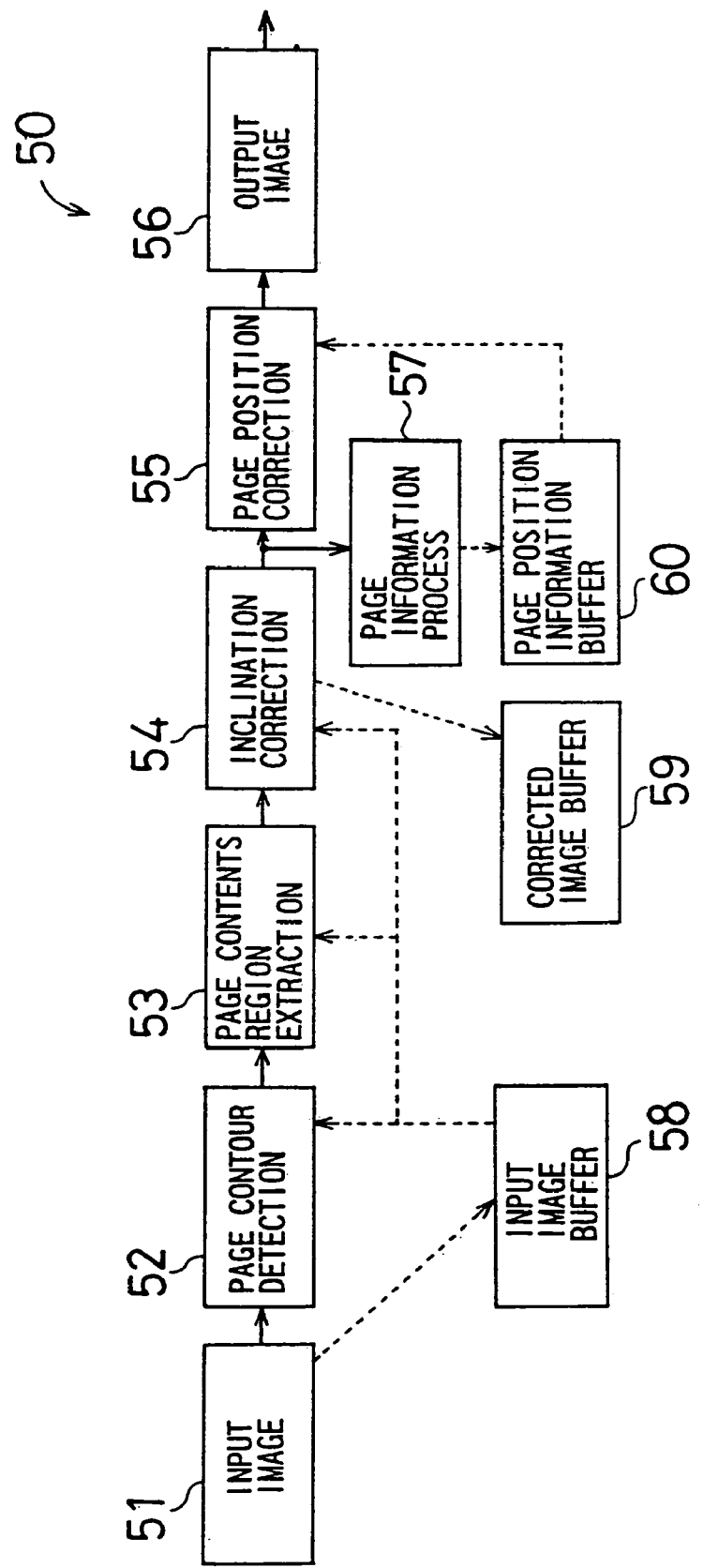
FIG. 28 is a block diagram of an image processing apparatus 50 in accordance with a tenth embodiment of the invention.

FIG. 28 is a block diagram of an image processing apparatus 50 in accordance with a tenth embodiment of the invention. In the image processing apparatus 50, an image inputting section 51 reads the image data page by page from an original of a book separated into pages. A page contour detecting section 52, a page contents region extracting section 53, an inclination correcting section 54, a page position correcting section 55 and a page information processing section 57 perform the processes described later using various buffers. The image outputting section 56 outputs the image data in which the alignment between the pages is corrected.

Figure 29:
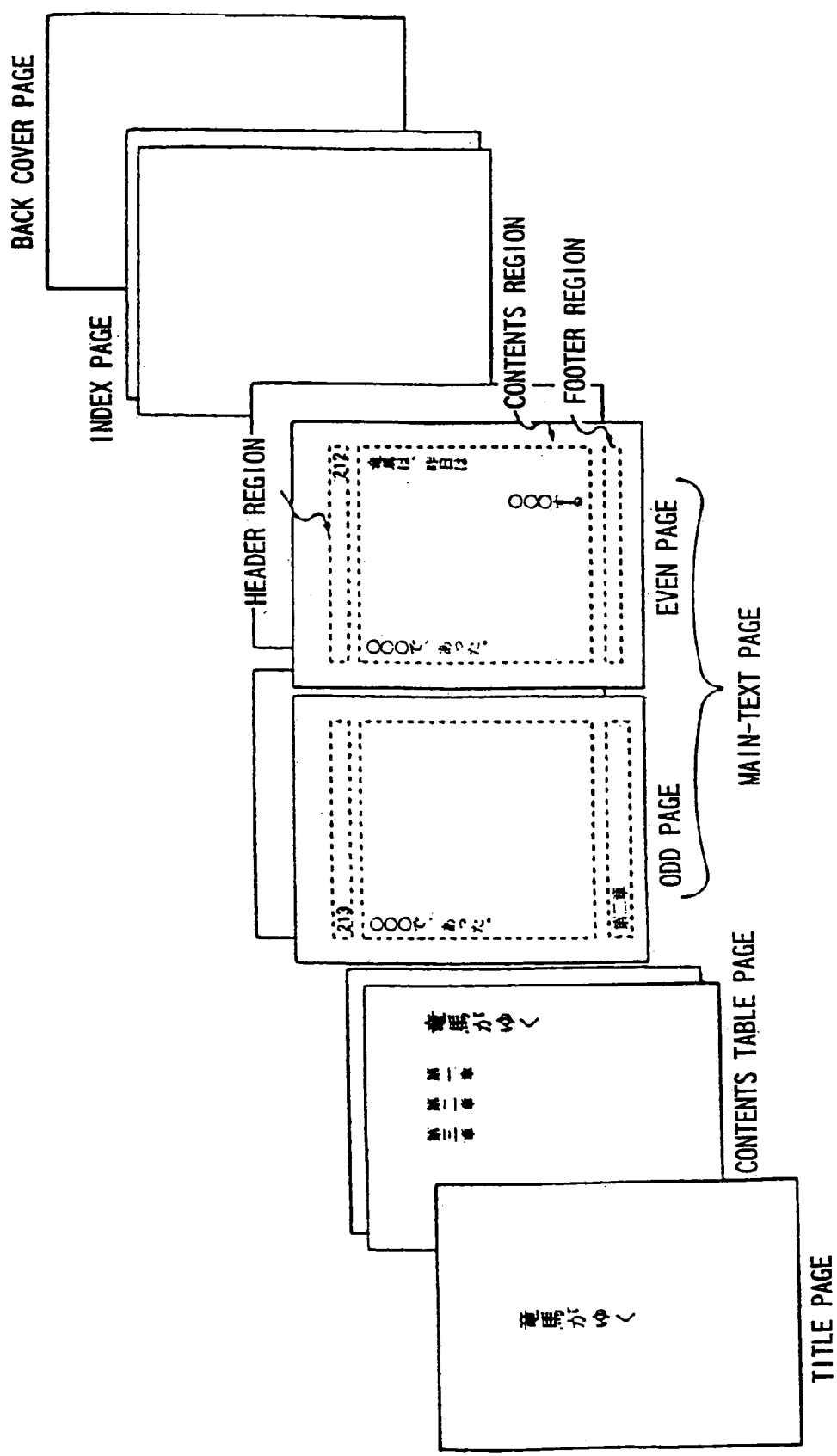
FIG. 29 is a schematic diagram showing the configuration of a book inputted to the image processing apparatus 50.

FIG. 29 is a schematic diagram showing the configuration of a novel book as an example of a book inputted to the image processing apparatus 50. In FIG. 29, the book inputted to the image processing apparatus 50 consists of a title (cover) page, contents table pages, main-text pages (even pages and odd pages), index pages and a back cover page. A majority of the pages are main-text pages each having a header region (shows a page number in the present example), a footer region (shows a chapter number in the example) and a contents region (main-text region) in a fixed position. The image processing apparatus 50 aligns the pages using such a feature.

The processes by respective sections of the image processing apparatus 50 are described below. The image inputting section 51 reads a binary or multi-valued image from a scanner and the like, and saves it in an input image buffer 58. This image may be a monochromatic image or a color image. The orientation of the image input is roughly correct, and the input is carried out in the sequence of the pages from the first or the last. In the case of the reading by a scanner and the like, it is preferable that the input region of the scanner is larger than the size of a page, considering the case of the inclined input due to the error of an automatic feeder, if used. This situation is assumed in the following description. When a page is larger than the input region of the scanner, it can be inputted in divided pieces and reconstructed in the input image buffer 58.

The page contour detecting section 52 is described below. Since the page is smaller than the input region of the scanner, the image inputted by the image inputting section 51 consists of an actual page region of the book and a background region behind it. The page contour detecting section 52 discriminates between the background region and the page region form the input image, thereby extracts the contour of the page region. Here, in the case where a book is used after being separated into pages, a page sometimes has the inclined or torn edge corresponding to the back portion. In that case, the contour is not an accurate rectangle, but is assumed to be approximated by a rectangle.

The methods for detecting the contour of a page region include a method in which an edge portion is detected from the image thereby detecting the fact that each angle of the rectangle is 90 degree from the edge point, a method in which an ensemble of edge points having a large change in brightness is extracted thereby obtaining a straight line from the ensemble thereby extracting the contour and the like.

Figure 30:
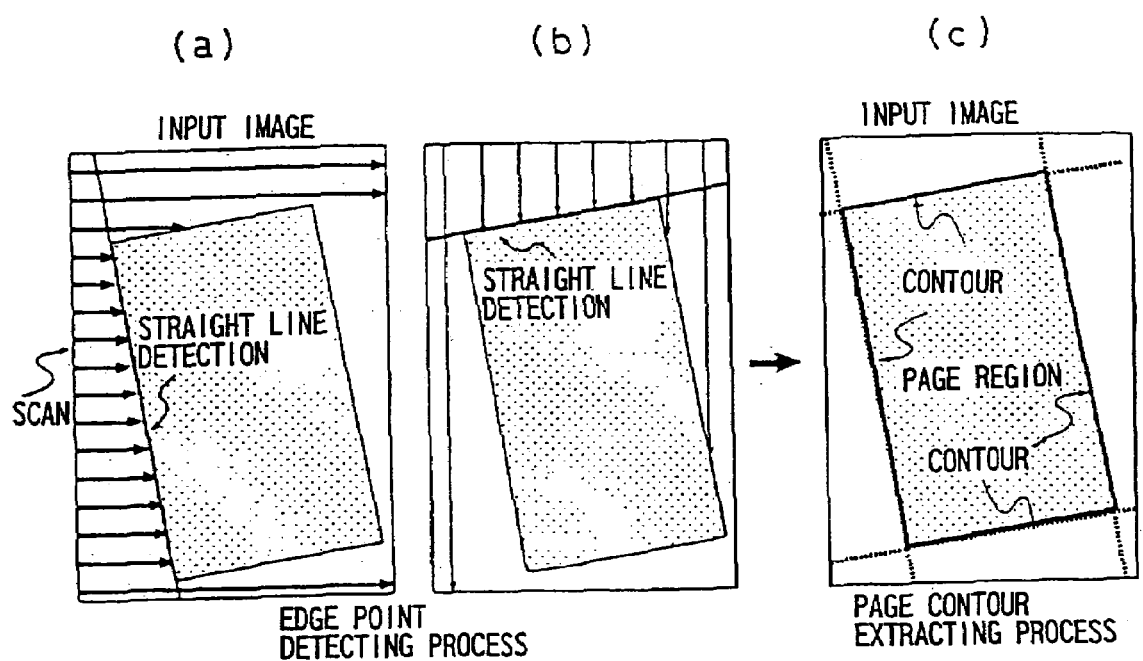
FIG. 30 is a diagram for describing the page-contour detecting operation of a page-contour detecting section 52.
Figure 31:
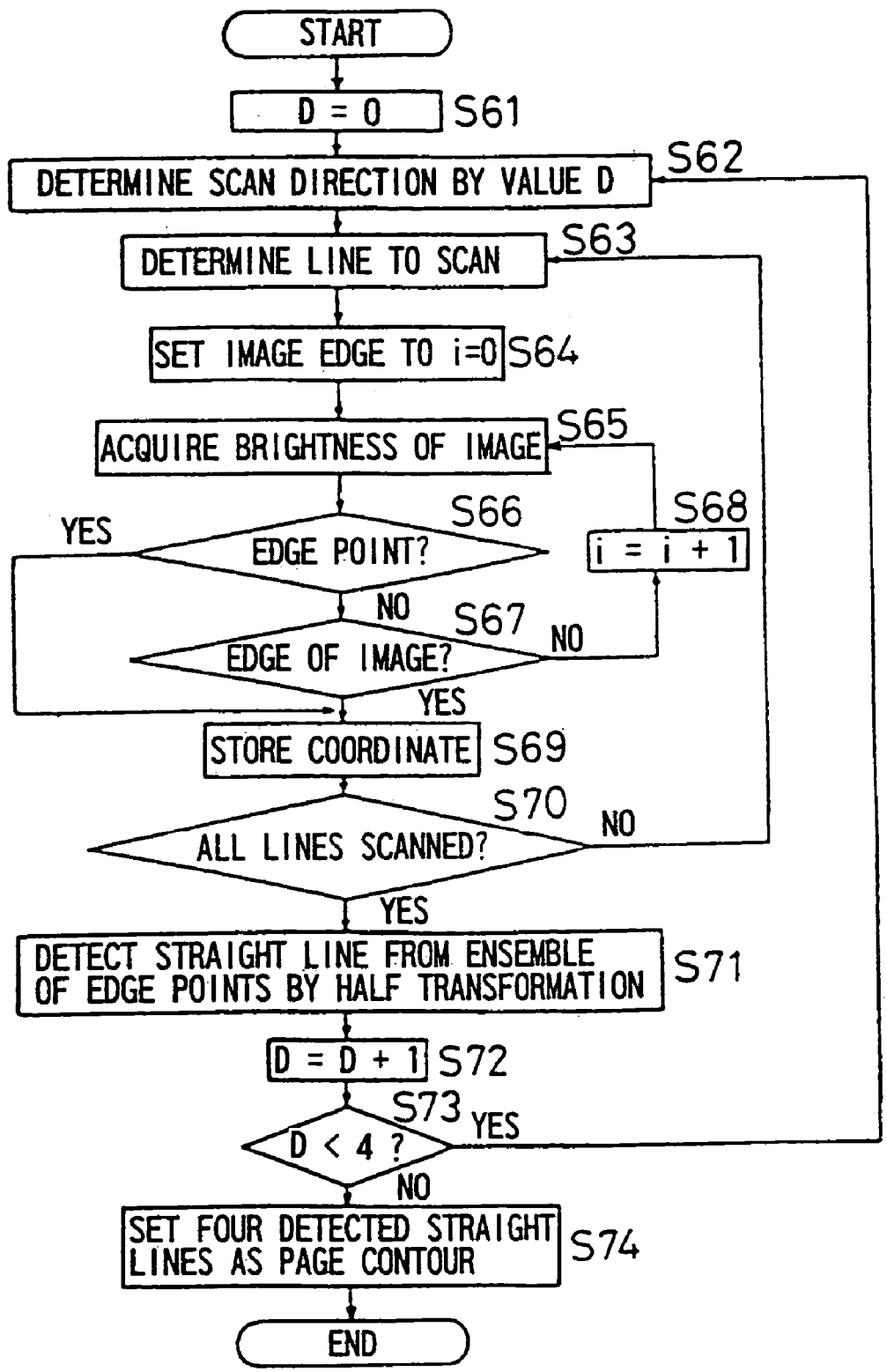
FIG. 31 is a flow chart for describing the page-contour detecting technique of the page-contour detecting section 52.

An example of a technique of detecting the contour of a page region is described below with reference to FIGS. 30 and 31. FIG. 30 is a diagram for describing this technique. FIG. 31 is a flowchart for describing this technique. Since the contour of a page region is a rectangle, a method of detecting the four straight lines in the outermost location of the image is described herein.

First, description is made for the case of detecting a contour line in the left side of the page region shown in FIG. 30(a) (S61, S62). A line to scan is selected firstly (S63). The top row is selected here because the scan is carried out horizontally. Since the scan is carried out from left to right, the left end is set to the initial value (i=0) (S64). Scanning the image sequentially, the brightness of each point is acquired from the input image buffer 58 (S56). Determination is carried out whether the point is an edge point or not (S66). The method of the determination is to calculate the first-order differential in the horizontal direction. An example of this is the method using a Sorbel filter. When the point is determined as an edge point, the coordinate of the point is stored (S69), the scanning of the line is terminated, and the next line is selected. Such a scan is carried out through all the lines to the bottom row (S69). When the point is determined not as an edge point, it is determined whether an edge of the image or not (S67). When it is determined as an edge of the image, it proceeds to S69. When it is determined not as an edge of the image, i=i+1 is set (S68), and it returns to S65. As a result, an ensemble of the coordinate of the edge points is obtained. A majority of these accumulate on a straight line. Thus, the straight line is calculated. This is typically carried out by the half transformation (S71). The process described above is carried out in each of the four directions (corresponding to D=0-3 in the flow of FIG. 31) of the input image (FIG. 30(b)) (S72), thereby obtaining four straight lines (S73), thereby detecting these straight lines as the contour of the page region (FIG. 30(c)) (S74).

Figure 32:
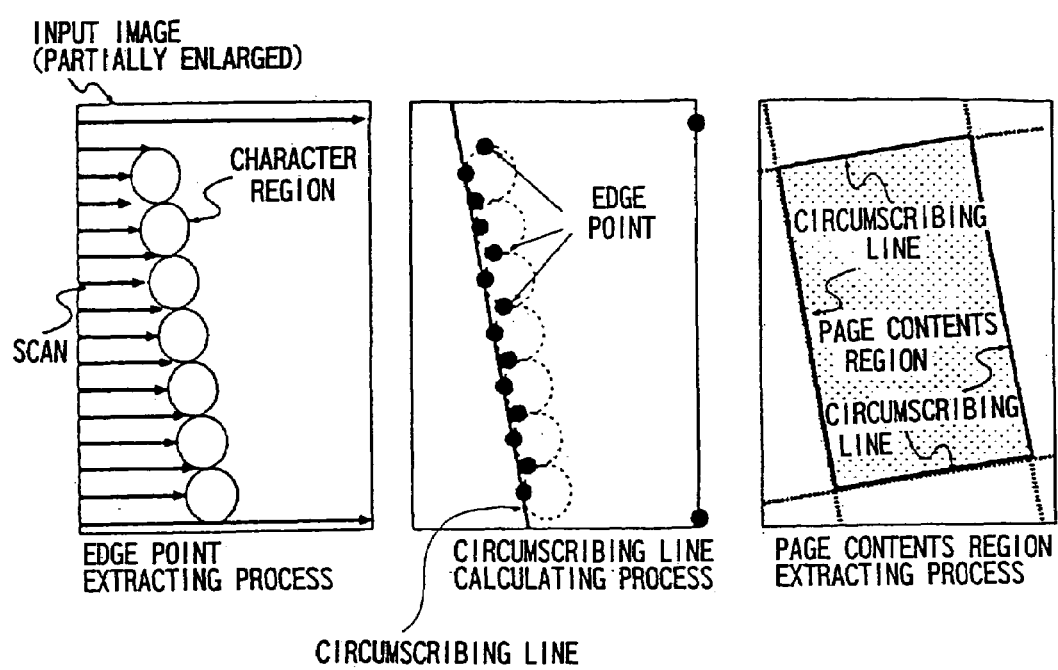
FIG. 32 is a diagram for describing the page-contents region extracting operation of a page-contents region extracting section 53.
Figure 33:
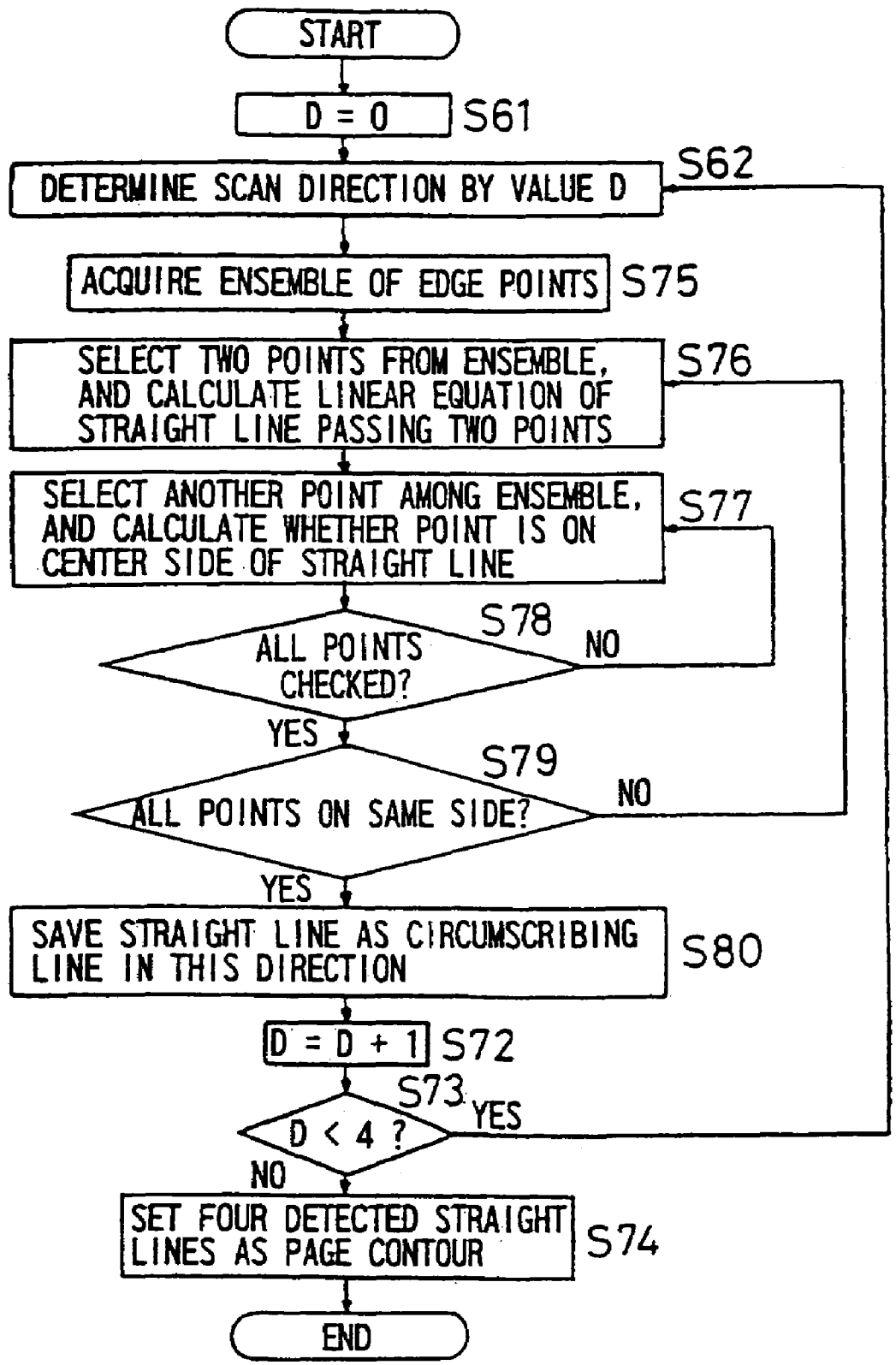
FIG. 33 is a flow chart for describing the page-contents region extracting technique of the page-contents region extracting section 53.

The page contents region extracting section 53 is described below with reference to FIGS. 32 and 33. The page contents region extracting section 53 extracts a page contents region from the image within the contour of the page region obtained by the page contour detecting section 52. FIG. 32 is a diagram for describing this technique. FIG. 33 is a flow chart for describing this technique.

As shown in FIG. 32(a), scanning the image in the sequence of the lines (S61, S62), an edge point is extracted. This is by the same method as the page contour detecting section 52. This edge point may be an edge of a character, a section line in a figure or table, or an edge of a balloon of a cartoon. However, an edge point of a character region is to be obtained in the present example. In the case of a character string and the like, the obtained edge point ensemble does not exists on a straight line. Thus, obtaining the lines (straight lines) circumscribing such an edge ensemble (FIG. 32(b)), the straight lines are set as the boundary of the page contents region (FIG. 32(c)) herein.

The method of obtaining the circumscribing line is described again with reference to FIG. 33. First, an edge point ensemble is obtained (S75). Selecting two points from the edge point ensemble, the equation of the straight line passing through the two points is obtained (S76). The equation of the straight line is $$(y2-y1)x-(x2-x1)y-(x1y2-x2y1)=0$$

with the coordinate of the two points (x1, y1) and (x2, y2).

It is determined on which side of the straight line another edge point not selected exists (S77). The determining equation is $$F(x, y)=(y2-y1)x+(x2-x1)y-x1y2+x2y1$$

where the point (x, y) locates on the origin side when $F(x, y)<0$ and outside when $F(x, y)>0$.

When all the points locate on the same side, the straight line is a circumscribing line. Otherwise, another two points are selected (S78-80). Repeating for all the combination, an circumscribing line can be obtained definitely.

By carrying out the process described above in each of the four scanning directions (corresponding to D=0-3 in the flow of FIG. 33) (S72), four straight lines is obtained (S73), whereby the page contents region can be extracted as a figure surrounded by the circumscribing lines (FIG. 32(c)) (S74).

The inclination correcting section 54 is described below. The inclination correcting section 54 performs the process of rotating with respect to the reference coordinate axes based on the figure of the circumscribing lines extracted by the page contents region extracting section 53, thereby correcting the inclination of the input image. The process is carried out on all the pages of the book.

Figure 34:
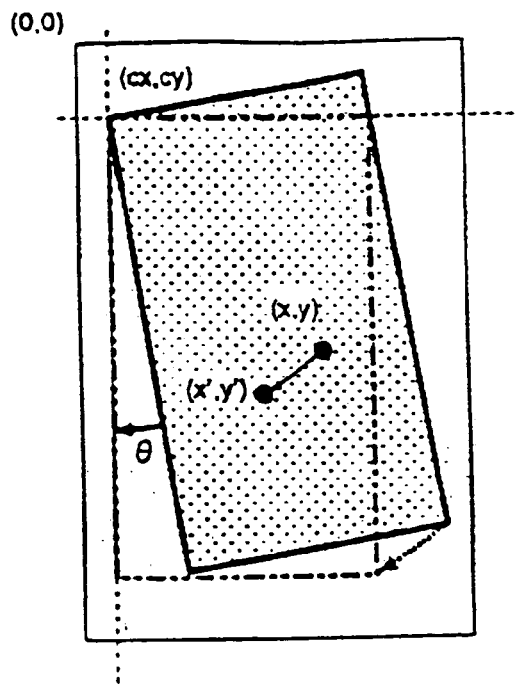
FIG. 34 is a diagram showing the situation of an image rotation.

FIG. 34 is a diagram showing the situation of the image rotation. The center of the rotating conversion is set to the coordinate (cx, cy) of an corner of the page contents region. In a rotation of the input image by θ, the coordinate of a point on the input image is (x, y) and the coordinate of a point on the corrected image after the conversion is (x', y'). The conversion formula of this rotation is $$\begin{pmatrix} x' \\ y' \end{pmatrix} = \begin{pmatrix} \cos(\theta) & -\sin(\theta) \\ \sin(\theta) & \cos(\theta) \end{pmatrix} \begin{pmatrix} x-cx \\ y-cy \end{pmatrix} + \begin{pmatrix} cx \\ cy \end{pmatrix}$$

In the rotating process, this formula is applied to each pixel on the input image buffer 58, thereby assigning a brightness or a color to the converted coordinate on a corrected image buffer 59.

The page information processing section 57 is described below. The page information processing section 57 determines whether the input image of a book is a main-text page or the other page. The method of the determination is a method in which the size or the shape of the figure of the circumscribing lines extracted by the page contents region extracting section 53 is compared and it is determined as a main-text page when the size or the shape is within a predetermined range. An alternative method is a method in which consecutive pages are determined as the main-text pages during the consecutive pages having an almost constant size of the rectangle of the circumscribing lines continue. This method depends on the fact that the input is carried out in the sequence of the pages and that the main-text pages have an almost constant size of the rectangle of the circumscribing lines detected by the page contents region extracting section 53. Another alternative method is a method in which the first page of and the last page (sheet numbers) of the main-text pages are previously specified externally. This method also depends on the fact that the input is carried out in the sequence of the pages. Further, when determining as a main-text page, the page information processing section 57 stores the positional information of the page contents region in the rectangle of the circumscribing lines into a page positional information buffer 60, and uses it as a template for aligning the main-text images and, hence, the pages. When the page positional information buffer 60 already contains the positional information of the template indicating a main-text page used as a reference for the page alignment, it proceeds to the page position correcting section 55.

The page position correcting section 55 is described below. Although the inclination of an input image is corrected, the position of the page contents region of the main-text page varies image by image because of mechanical deviation and the like during the reading. If the intact main-text pages are outputted as an electronic book without position correction, the positional variation occurs during the viewing of the contents of the main-text pages in a viewer and the like, which causes uncomfortableness. Thus, the page position correcting section 55 corrects, using a parallel displacement, the position of the images of the main-text pages the inclination of which is corrected, so as to coincide with the positional information of the template indicating a main-text page stored in the page positional information buffer 60. As a result, the image outputting section 56 can provide the image data in which the main-text pages are aligned. In other words, once the template is obtained from a page determined as a main-text page, the subsequent main-text pages are aligned with the reference to the template.

Figure 35:
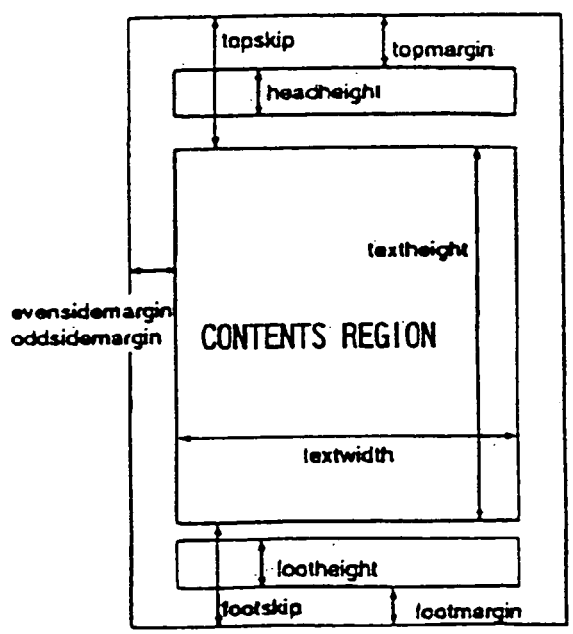
FIG. 35 is a diagram showing the form of a template stored in a page positional information buffer 60.

The above-mentioned template includes all of the header region, the footer region and the contents region of a main-text page. However, each region may be separated as shown in FIG. 35(a), and stored into the page positional information buffer 60 in the form shown in FIG. 35(b). Such a separation simplifies character recognition, key word extraction, and the like, thereby simplifying the structuring of a document.

In the above-mentioned description, all the processes are automated. However, the processes of the page contour detecting section 52, the page contents region extracting section 53, and the inclination correcting section 54 may be carried out manually.

ELEVENTH EMBODIMENT

The images of a book is ordinarily inputted automatically and sequentially. Accordingly, whether the next input is a main-text page or the other is not known at the time of the input. Further, even in the case of a main-text page, the size of the page contents region differs, for example, in the last page of a chapter. Thus, even in the case where a page is determined as a main-text page, when the positional information of the page contents region of the newly input image differs from the positional information of the template in the page positional information buffer 60 (when the positional information is out of a predetermined range), an error is concluded, an error bit is written into an error buffer (not shown) page by page, and warning data is generated and maintained. Accordingly, a user can easily recognize the pages the error of which is to be corrected by a manual process, by watching the warning data from the error buffer through display means (not shown) after the completion of the automatic process of the whole book.

The series of the above-mentioned processes can implemented with a program. The program may be recorded on a computer-readable recording medium, such as an optical disk and a floppy disk, to be used after being read out when necessary.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

In accordance with the first invention, it is possible to produce a monochromatic image in such a manner that the color analyzing means analyzes the color used within the image inputted from the image inputting means, the mixing-ratio calculating means calculates the mixing-ratio of color components such as red, green and blue based on the analyzed color, and the converting means mixes color components according to the calculated mixing-ratio. By such an image processing apparatus, the color of the input image is automatically determined and a monochromatic image can be produced.

In accordance with the second invention, it is possible to produce a monochromatic image in such a manner that the color analyzing means analyzes colors used within a plurality of images inputted from the image inputting means, the mixing-ratio calculating means calculates the mixing-ratios of color components which are common to the plurality of images, based on the analyzed color, and the converting means mixes color components according to the calculated mixing-ratios. By such an image processing apparatus, the colors of the plurality of input images are automatically determined and monochromatic images can be produced. Further, since the color determination is carried out in the plurality of input images, the color can be determined more accurately. Furthermore, since monochromatic images are produced in the same conditions for the plurality of input images, the images can be produced stably.

In accordance with the third invention, it is possible to produce a monochromatic image in such a manner that an image is inputted from the image inputting means, the color specifying means specifies the color used within the image, the mixing-ratio calculating means calculates the mixing-ratio of color components based on the specified color, the converting means mixes the color components according to the calculated mixing-ratio. By such an image processing apparatus, a monochromatic image with higher accuracy can be produced by specifying the color used within the input image by a user.

In accordance with the fourth invention, an image is inputted from the image inputting means, the mixing-ratio specifying means specifies the mixing-ratio of color components for the image, and the converting means mixes the color components based on the specified mixing-ratio. By such an image processing apparatus, a desired monochromatic image can be produced by specifying the mixing-ratio of a color component by a user.

In accordance with the fifth invention, data is inputted, the color used within the image is analyzed, the mixing-ratio of color components is calculated based on the analyzed color, and color components are mixed according to the calculated mixing-ratio. By such an image processing method, the color of the input image is automatically determined and a monochromatic image can be produced.

In accordance with the sixth invention, the color used within the image is analyzed based on the distribution of the hue, saturation and lightness of the input image. By such an image processing method, the color of the input image is automatically determined and a monochromatic image can be produced.

In accordance with the seventh invention, the data of a plurality of original images is inputted, the colors used within the images are analyzed, the mixing-ratios of color components, common to the plurality of images, are calculated based on the analyzed colors, and color components are mixed according to the calculated mixing-ratio. By such an image processing method, the colors of the plurality of input images are automatically determined and respective monochromatic images can be produced. Further, since colors are determined from the plurality of input images, the colors can be determined more accurately. Furthermore, since monochromatic images are produced in the same conditions for the plurality of input images, the images can be produced stably.

In accordance with the eighth invention, the color used within the input image is specified, the mixing-ratio of color components is calculated based on the color, and color components are mixed according to the calculated mixing-ratio. By such an image processing method, a monochromatic image with higher accuracy can be produced by specifying the color used within the input image by a user.

In accordance with the ninth invention, the mixing-ratio is calculated by referring to the mixing-ratio table. By such an image processing method, the color of the input image is automatically determined and a monochromatic image can be produced. Further, by calculating the mixing-ratio with reference to the mixing-ratio table, optimum mixing-ratio is rapidly obtained for each color used within the image. Thus, more optimum monochromatic image can be produced at high speed.

In accordance with the tenth invention, the mixing-ratio is calculated according to the color components ratio of the complimentary color of the color used within the input image. By such an image processing method, the color of the input image is automatically determined and a monochromatic image with high contrast can be produced.

In accordance with the eleventh invention, the mixing-ratio is calculated based on the color component ratio of the complimentary color of the color used within the input image and the color component ratio used within the input image. By such an image processing method, the color of the input image is automatically determined, and a high-contrast monochromatic image in which the color used in the input image is easily discriminated from black can be produced.

In accordance with the twelfth invention, the mixing-ratio of the color components of the input image is specified, and color components are mixed according to the mixing-ratio. By such an image processing method, a desired monochromatic image can be produced by specifying the mixing-ratio of a color component by a user.

In accordance with the thirteenth invention, a computer analyzes a color used within an input image, calculates the mixing-ratio of color components based on the color, and mixes the color components according to the mixing-ratio. Accordingly, a medium can be provided which records an image processing program such that the color of the input image is automatically determined and a monochromatic image is produced.

In accordance with the fourteenth invention, a computer analyzes the colors used within a plurality of input images, calculates the mixing-ratios of color components, common to the plurality of input images, based on the colors, and mixes the color components according to the mixing-ratios. Accordingly, a medium can be provided on which an image processing program is recorded such that the colors of the plurality of input images are automatically determined and monochromatic images are produced.

In accordance with the fifteenth invention, a medium can be provided on which an image processing program of a computer for producing a monochromatic image with higher accuracy by specifying a color used within an input image by a user is recorded, the image processing program comprising the steps of specifying a color used within an input image, calculating a mixing-ratio of color components based on the color, mixing color components according to the mixing-ratio, and producing a monochromatic image with higher accuracy.

In accordance with the sixteenth invention, a computer specifies a mixing-ratio for an input image, and mixes the color components according to the specified mixing-ratio. Accordingly, a medium can be provided on which an image processing program is recorded such that a desired monochromatic image is produced by a user specifying the mixing-ratio of a color component.

In accordance with the seventeenth invention, the image inputting means inputs an image, from the image the character/line drawing region extracting means extracts a character/line drawing region and the pseudo-density region extracting means extracts a pseudo-density region, the image contracting means contracts the image using mutually different methods respectively in the pseudo-density region, the character/line drawing region and the region other than the pseudo-density region and the character/line drawing region, and the image outputting means outputs the contracted image. Using such an image processing apparatus, by dividing the input image into three regions, i.e., pseudo-density region, character/line drawing region and the other region, the image can be contracted with a moire being suppressed in the pseudo-density region, the image can be clearly contracted in the character/line drawing region, and the image can be properly contracted in the other region.

In accordance with the eighteenth invention, the image contracting means contracts the image by a smoothing process in the pseudo-density region, contracts the image by an averaging process and a subsequent edge enhancing process in the character/line drawing region, and contracts the image by an averaging process in the other region, and the image outputting means outputs the contracted image. By such an image processing apparatus, the image can be contracted with a moire being suppressed in the pseudo-density region, the image can be clearly contracted in the character/line drawing region, and the image can be properly contracted in the other region.

In accordance with the nineteenth invention, from the input image the character/line drawing region extracting means extracts a character/line drawing region, and thereafter the pseudo-density region extracting means extracts a pseudo-density region. By such an image processing apparatus, a character/line drawing region is firstly extract from the input image, and a pseudo-density region is then extracted. Therefore, the character/line drawing region can be accurately extracted without being affected from the pseudo-density region, even when it exists within the pseudo-density region.

In accordance with the twentieth invention, the character/line drawing region is extracted by the edge extraction of the input image after the smoothing process thereof. By such an image processing apparatus, a character/line drawing region is firstly extract from the input image as mentioned above, and a pseudo-density region is then extracted. Therefore, the character/line drawing region can be accurately extracted without being affected from the pseudo-density region, even when it exists within the pseudo-density region.

In accordance with the twenty-first invention, the pseudo-density region is extracted by calculating the dispersion of the peripheral pixels around each pixel of the input image and by extracting the pixel which is one of the pixels having a large dispersion and exists in the region which is not extracted as a character/line drawing region. Using such an image processing apparatus, by calculating the dispersion of peripheral pixels and by extracting, as a pseudo-density region, the pixel is one of the pixels having a large dispersion and exists in the region which is not extracted as a character/line drawing region, the character/line drawing region is eliminated, whereby the pseudo-density region alone can be extracted accurately.

In accordance with the twenty-second invention, the pseudo-density region is extracted by calculating the correlation of the peripheral pixels around each pixel of the input image and by extracting the pixel which is one of the pixels having a low correlation and exists in the region which is not extracted as a character/line drawing region. Using such an image processing apparatus, by calculating the correlation of peripheral pixels and by extracting, as a pseudo-density region, the pixel which is one of the pixels having a low correlation and exists in the region which is not extracted as a character/line drawing region, the character/line drawing region is eliminated more securely, whereby the pseudo-density region alone can be extracted accurately.

In accordance with the twenty-third invention, the pseudo-density region is extracted by detecting an edge region of the input image and by extracting the region which is one of the edge regions and is not extracted as a character/line drawing region. By such an image processing apparatus, the edge filter is simple, and the pseudo-density region can be extracted faster.

In accordance with the twenty-fourth invention, the edge detection is carried out in the pseudo-density region and the smoothing process is repeated for a region having a density greater than or equal to a predetermined value. By such an image processing apparatus, the image can be precisely contracted with a moire being suppressed more securely in the pseudo-density region.

In accordance with the twenty-fifth invention, the edge detection is carried out in the pseudo-density region and the contracting process is interrupted for a region having a density greater than or equal to a predetermined value. By such an image processing apparatus, the normal contracting process can be continued with an unnecessary contracting process being avoided.

In accordance with the twenty-sixth invention, an image is inputted, a character/line drawing region is extracted from the image, and a pseudo-density region is extracted, the image is contracted using mutually different methods respectively in the pseudo-density region, the character/line drawing region and the other region, and the image is then outputted. By such an image processing method, the image can be contracted with a moire being suppressed in the pseudo-density region, the image can be clearly contracted in the character/line drawing region, and the image can be properly contracted in the other region.

In accordance with the twenty-seventh invention, a computer extracts a character/line drawing region from the image, extracts a pseudo-density region, contracts the image using mutually different-methods respectively in the pseudo-density region, the character/line drawing region and the other region, and outputs it. Accordingly, a medium can be provided which records an image processing program such that the image is contracted with a moire being suppressed in the pseudo-density region, the image is clearly contracted in the character/line drawing region, and the image is properly contracted in the other region.

In accordance with the twenty-eighth invention, front and back images are inputted from the image inputting means; after one of the images is reversed by the image reversing means, the positional relationship between the front and back images is detected by the positional relationship detecting means; and the image is corrected to be free from a ghost image by the image correcting means using the positional relationship, and then outputted by the image outputting means. By such an image processing apparatus, the input image can be outputted without a ghost image.

In accordance with the twenty-ninth invention, the positional relationship between the front and back images is detected by extracting the high brightness component alone of the front and back images and by performing the block matching of the high brightness component. By such an image processing apparatus, the positional relationship can be detected more precisely, and the input image can be outputted more securely without a ghost image.

In accordance with the thirtieth invention, the image inputting means inputs an image, the edge detecting means detects an edge of the image, the image correcting means corrects the image to eliminate a ghost image of the image by raising the brightness of high brightness pixels other than the edge of the image outputted from the edge detecting means, and the image outputting means outputs the image. By such an image processing apparatus, the input image can be outputted with the unclearness of a character being prevented and without a ghost image.

In accordance with the thirty-first invention, the image inputting means inputs an image, the edge detecting means detects an edge of the image, the image dividing means divides the image based on the edge and low brightness pixels of the image outputted from the edge detecting means, the image correcting means corrects the image to eliminate a ghost image of the image by calculating the average brightness within a divided region and by raising the brightness of the high brightness region alone, and the image outputting means outputs the image. By such an image processing apparatus, the input image can be outputted with the whitening-out of a halftone section being prevented and without a ghost image.

In accordance with the thirty-second invention, the image in a high brightness region is corrected by obtaining the representative brightness from the pixels having a brightness within a predetermined range and by raising the brightness of the region with the referencing to the representative brightness. By such an image processing apparatus, the input image can be outputted without a ghost image, free from the influence of the difference in the transmittance depending on the paper quality.

In accordance with the thirty-third invention, front and back images are inputted, after one of the images is reversed, the positional relationship between the front and back images is detected, and the image is corrected to be free from a ghost image using the positional relationship, and then outputted. By such an image processing method, the input image can be outputted without a ghost image.

In accordance with the thirty-fourth invention, an image is inputted, and an edge of the image is detected, and the image is corrected to be free from a ghost image of the image by raising the brightness of high brightness pixels other than the edge of the image outputted from the edge detection, and then outputted. By such an image processing method, the input image can be outputted with the unclearness of a character being prevented and without a ghost image.

In accordance with the thirty-fifth invention, an image is inputted, and an edge of the image is detected, the image is divided based on the edge and the low brightness pixels of the image outputted from the edge detection, and the image is corrected to be free from a ghost image of the image by calculating the average brightness within a divided region and by raising the brightness of the high brightness region alone, and then outputted. By such an image processing method, the input image can be outputted with the whitening-out of a halftone section being prevented and without a ghost image.

In accordance with the thirty-sixth invention, a computer reverses one of inputted front and back images, after that, detects the positional relationship between the front and back images, corrects the image to eliminate a ghost image using the positional relationship, and outputs it. Accordingly, a medium can be provided which records an image processing program such that the input image is outputted without a ghost image.

In accordance with the thirty-seventh invention, a computer detects an edge of an inputted image, corrects the image to eliminate a ghost image of the image by raising the brightness of high brightness pixels other than the edge of the image outputted from the edge detection, and outputs it. Accordingly, a medium can be provided which records an image processing program such that the input image is outputted with the unclearness of a character being prevented and without a ghost image.

In accordance with the thirty-eighth invention, a computer detects an edge of an inputted image, divides the image based on the edge and the low brightness pixels of the image outputted from the edge detection, corrects the image to eliminate a ghost image of the image by calculating the average brightness within a divided region and by raising the brightness of the high brightness region alone, and outputs it. Accordingly, a medium can be provided which records an image processing program such that the input image is outputted with the whitening-out of a halftone section being prevented and without a ghost image.

In accordance with the thirty-ninth invention, the image inputting means inputs an image page by page. The image determining means determines a predetermined image from among the images. The template acquiring means acquires a template from the determined image. The image correcting means corrects the position between the images based on the template, thereby aligning the images of consecutive pages. By such an image processing apparatus, the alignment between desired consecutive images from among the images inputted page by page can be carried out in a short time.

In accordance with the fortieth invention, the image inputting means inputs an image page by page of a book, the image determining means determines a predetermined main-text image from among the images, the template acquiring means acquires a template from the determined image, and the image correcting means corrects the position between main-text images based on the template, thereby aligning the main-text images of consecutive pages. By such an image processing apparatus, the alignment between main-text images from among the main-text images inputted page by page can be carried out in a short time. Thus, the contents of an electronic book can be prepared in a short term. Further, since the position of the main-text images is aligned when the electronic book is viewed in a viewer, uncomfortableness to a user can be eliminated.

In accordance with the forty-first invention, a predetermined image is determined from among the images inputted page by page, a template is acquired from the determined image, and the position between the images is corrected based on the template, thereby aligning the images of consecutive pages. By such an image processing method, the alignment between desired consecutive images from among the images inputted page by page can be carried out in a short time.

In accordance with the forty-second invention, the template is acquired as the positional information of the rectangle defined by the circumscribing lines obtained from the ensemble of the edge points acquired by scanning the input image. By such an image processing method, since the template is acquired using the circumscribing lines, an accurate template can be obtained, thereby improving the precision of the alignment.

In accordance with the forty-third invention, a predetermined image is determined from among the input images, and warning data is generated in the case where the positional information of the input image and the positional information of the template are out of a predetermined range. By such an image processing method, failure in the alignment between the images can be detected, and hence, there is convenience in revision during or after the authoring.

In accordance with the forty-fourth invention, a predetermined main-text image is determined from among the images inputted page by page of a book, a template is acquired from the determined image, and the position between main-text images is corrected based on the template, thereby aligning the main-text images of consecutive pages. By such an image processing method, the alignment between main-text images from among the main-text images inputted page by page can be carried out in a short time. Thus, the contents of an electronic book can be prepared in a short term. Further, since the position of the main-text images is aligned when the electronic book is viewed in a viewer, uncomfortableness to a user can be eliminated.

In accordance with the forty-fifth invention, a computer determines a predetermined image from among the images inputted page by page, acquires a template from the determined image, and corrects the position between the images based on the template, thereby aligning the images of the consecutive pages. Accordingly, a medium can be provided which records an image processing program such that the alignment between desired consecutive images from among the images inputted page by page is carried out in a short time.

In accordance with the forty-sixth invention, a computer determines a predetermined main-text image from among the images inputted page by page of a book, acquires a template from the determined image, and corrects the position between main-text images based on the template, thereby aligning the main-text images of consecutive pages. Accordingly, a medium can be provided which records an image processing program such that the alignment between main-text images from among the main-text images inputted page by page is carried out in a short time.

The invention claimed is:

1. An image processing apparatus comprising:
   image inputting means for inputting an image;
   character/line drawing region extracting means for extracting a character/line drawing region from the input image;
   pseudo-density region extracting means for extracting a pseudo-density region from the input image;
   image contracting means for contracting images in an extracted pseudo-density region, an extracted character/line drawing region, and a region other than the pseudo-density region and the character/line drawing region, by mutually different methods; and
   image outputting means for outputting the contracted image.

2. The image processing apparatus of claim 1, wherein the image contracting means performs a smoothing process in the pseudo-density region, performs an averaging process and a subsequent edge enhancing process in the character/line drawing region, and performs an averaging process in a region other than the pseudo-density region and the character/line drawing region.

3. The image processing apparatus of claim 1, wherein the character/line drawing region extracting means extracts a character/line drawing region from the input image before the extraction of a pseudo-density region.

4. The image processing apparatus of claim 3, wherein the character/line drawing region extracting means extracts a character/line drawing region by performing an edge extraction of the input image after performing a smoothing process thereof.

5. The image processing apparatus of any one of claims 1, 3 or 4, wherein the pseudo-density region extracting means calculates a dispersion of peripheral pixels around each pixel of the input image and extracts, as a pseudo-density region, the pixel which is one of pixels having a large dispersion and exists in a region which is not extracted as a character/line drawing region by the character/line drawing region extracting means.

6. The image processing apparatus of any one of claims 1, 3 or 4, wherein the pseudo-density region extracting means calculates a correlation of peripheral pixels around each pixel of the input image and extracts, as a pseudo-density region, a pixel which is one of pixels having a low correlation and exists in the region which is not extracted as a character/line drawing region by the character/line drawing region extracting means.

7. The image processing apparatus of any one of claims 1, 3 or 4, wherein the pseudo-density region extracting means detects an edge region of the input image and extracts, as a pseudo-density region, a region which is one of the extracted edge regions and is not extracted as a character/line drawing region by the character/line drawing region extracting means.

8. The image processing apparatus of claim 2, wherein the contracting means performs edge detection of an extracted pseudo-density region and repeats the smoothing process for a region having a density greater than or equal to a predetermined value.

9. The image processing apparatus of claim 1, wherein the image contracting means performs edge detection of the extracted pseudo-density region and interrupts a contracting process for a region having a density greater than or equal to a predetermined value.

10. An image processing method comprising:
an image inputting step;
a character/line drawing region extracting step of extracting a character/line drawing region from an input image;
a pseudo-density region extracting step of extracting a pseudo-density region from the input image;
a image contracting step of contracting the image using mutually different methods respectively in the extracted pseudo-density region, the extracted character/line drawing region and the region other than the pseudo-density region and the character/line drawing region; and
an image outputting step of outputting an the contracted image.

11. A computer-readable medium which embodies an image processing program for causing a computer to execute an image inputting step; a character/line drawing region extracting step of extracting a character/line drawing legion from an input image; a pseudo-density region extracting step of extracting a pseudo-density region from the input image; an image contracting step of contracting the image using mutually different methods respectively in the extracted pseudo-density region, the extracted character/line drawing region and the region other than the pseudo-density region and the character/line drawing region; and an image outputting step of outputting a contracted image.

* * * * *